(12) United States Patent
Abboud et al.

(10) Patent No.: US 12,517,011 B2
(45) Date of Patent: Jan. 6, 2026

(54) METHOD FOR MONITORING A ROTATING MACHINE IN ORDER TO DETECT A FAULT IN AN AIRCRAFT BEARING

(71) Applicants: SAFRAN, Paris (FR); SAFRAN AIRCRAFT ENGINES, Paris (FR)

(72) Inventors: Dany Abboud, Moissy Cramayel (FR); Julien Christian Pascal Griffaton, Moissy Cramayel (FR); Mohammed El Badaoui, Moissy Cramayel (FR); José-Luis Gomez Chirinos, Moissy Cramayel (FR); Christian Courrech-Nielsen, Moissy Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/858,609

(22) PCT Filed: Apr. 20, 2023

(86) PCT No.: PCT/FR2023/050572
§ 371 (c)(1),
(2) Date: Oct. 21, 2024

(87) PCT Pub. No.: WO2023/203304
PCT Pub. Date: Oct. 26, 2023

(65) Prior Publication Data
US 2025/0271330 A1    Aug. 28, 2025

(30) Foreign Application Priority Data
Apr. 22, 2022 (FR) .................................... 2203779

(51) Int. Cl.
| | | |
|---|---|---|
| *G06G 7/70* | (2006.01) | |
| *G01M 13/045* | (2019.01) | |
| *G01M 15/12* | (2006.01) | |

(52) U.S. Cl.
CPC .......... *G01M 13/045* (2013.01); *G01M 15/12* (2013.01)

(58) Field of Classification Search
CPC .......... G01M 15/14; G01M 1/08; G01M 1/22; G01H 1/003; G01R 23/16
(Continued)

(56) References Cited

U.S. PATENT DOCUMENTS

2012/0272736 A1    11/2012  Griffaton et al.
2013/0096848 A1*    4/2013  Hatch ................. G01M 13/045
                                                    702/39

(Continued)

FOREIGN PATENT DOCUMENTS

| EP | 2 496 921 A1 | 9/2012 |
| FR | 2 952 177 B1 | 6/2012 |

(Continued)

OTHER PUBLICATIONS

Antoni, J., et al., "Unsupervised noise cancellation for vibratory signals: part II—a novel frequency-domain algorithm," Mechanical Systems and Signal Processing, vol. 18, Issue 1, (Year: 2004), pp. 103-117.

(Continued)

*Primary Examiner* — Logan M Kraft
*Assistant Examiner* — James J Kim
(74) *Attorney, Agent, or Firm* — Pillsbury Winthrop Shaw Pittman LLP

(57) ABSTRACT

A method for monitoring a rotating machine in order to detect a fault in a bearing, the method including acquiring, from the rotating machine, a vibration signal measured by a (Continued)

vibration sensor; determining a first-order spectrogram by first-order cyclostationary analysis of the vibration signal using a delta transform and spectral standardisation; determining a second-order spectrogram by second-order cyclostationary analysis of the vibration signal using averaged cyclic coherence, a delta transform and spectral standardisation; and detecting a vibration signature of the fault in the bearing on the basis of the first-order spectrogram and the second-order spectrogram.

11 Claims, 6 Drawing Sheets

(58) Field of Classification Search
USPC .......................................................... 701/110
See application file for complete search history.

(56) References Cited

U.S. PATENT DOCUMENTS

| | | | |
|---|---|---|---|
| 2014/0039809 A1* | 2/2014 | Girondin | G01M 13/045 702/39 |
| 2021/0080352 A1* | 3/2021 | Abboud | G01M 15/02 |
| 2021/0286995 A1* | 9/2021 | Zhu | G01M 13/045 |
| 2022/0412793 A1* | 12/2022 | Marnissi | G01M 1/08 |

FOREIGN PATENT DOCUMENTS

| | | |
|---|---|---|
| FR | 3 076 348 B1 | 7/2019 |
| WO | WO 2011/054867 A1 | 5/2011 |

OTHER PUBLICATIONS

International Search Report as issued in International Patent Application No. PCT/FR2023/050572, dated Aug. 11, 2023.
Wang, Y., et al., "Order spectrogram visualization for rolling bearing fault detection under speed variation conditions," Mechanical Systems and Signal Processing, vol. 122, Dec. 2018, pp. 580-596, XP085582138.
Pham, M. T., et al., "Accurate Bearing Fault Diagnosis under Variable Shaft Speed using Convolutional Neural Networks and Vibration Spectrogram," Applied Sciences, vol. 10, No. 18, Sep. 2020, p. 6385, XP093003751.
P, Arun., et al., "A Method for the Investigation of Bearing Vibration Based on Spectrogram Image Comparison," IOP Conference Series: Materials Science and Engineering vol. 396, Aug. 2018, p. 012044, XP093003748, DOI: 10.1088/1757-899X/396/I/012044, Retrieved from the Internet: URL:https://iopscience.iop.org/article/10.1088/1757-899X/396/I/012044 [Retrieved on Nov. 30, 2022].

* cited by examiner

[Fig. 1]
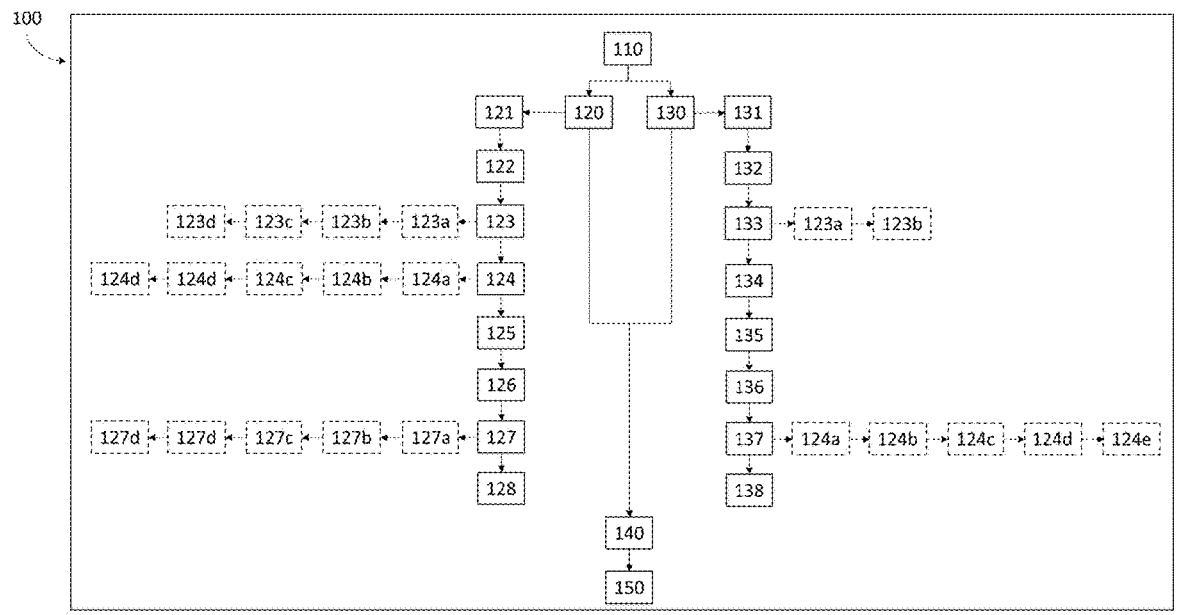
[Fig. 2]
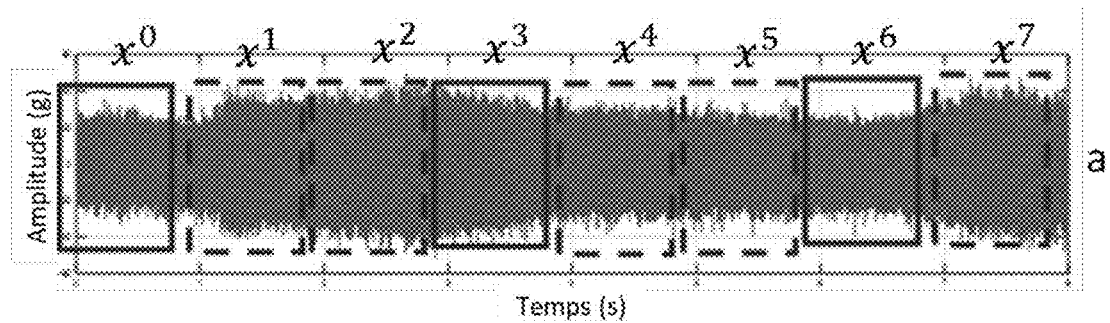
a
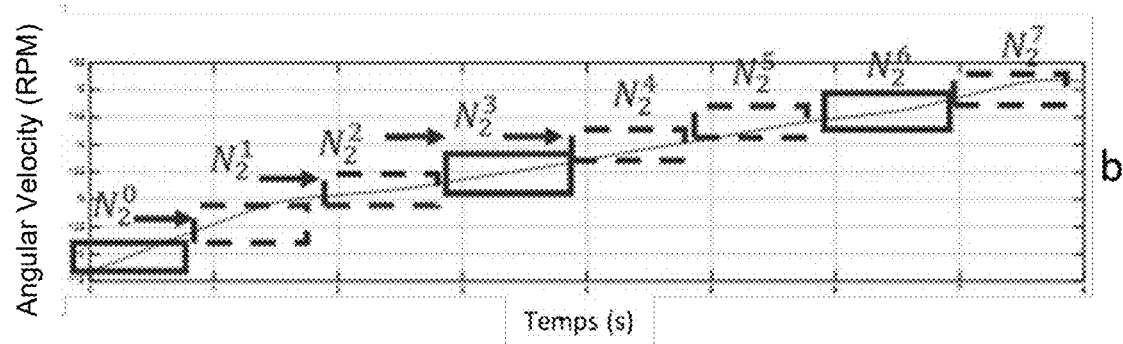
b

[Fig. 3]
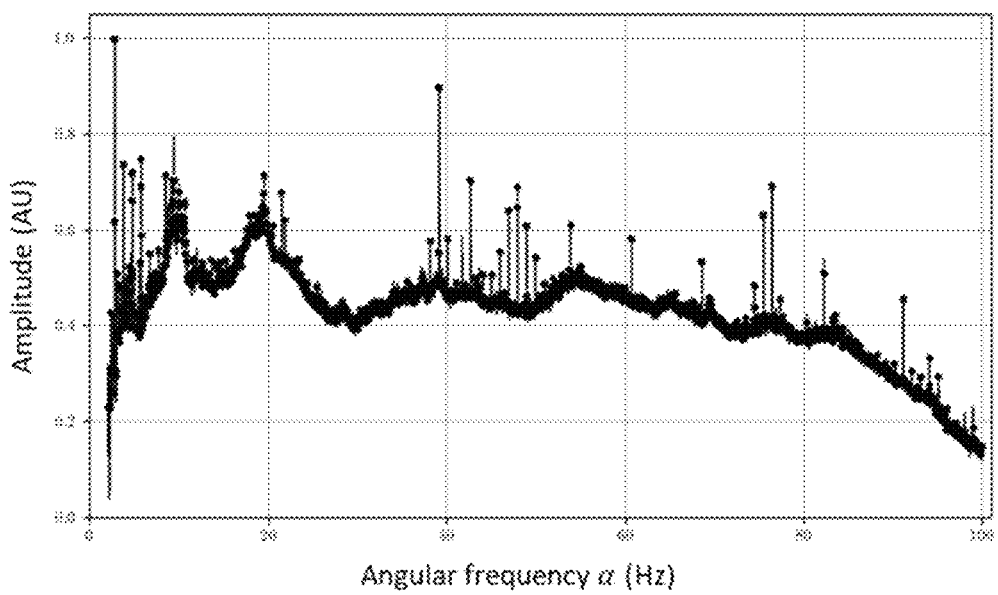
[Fig. 4]
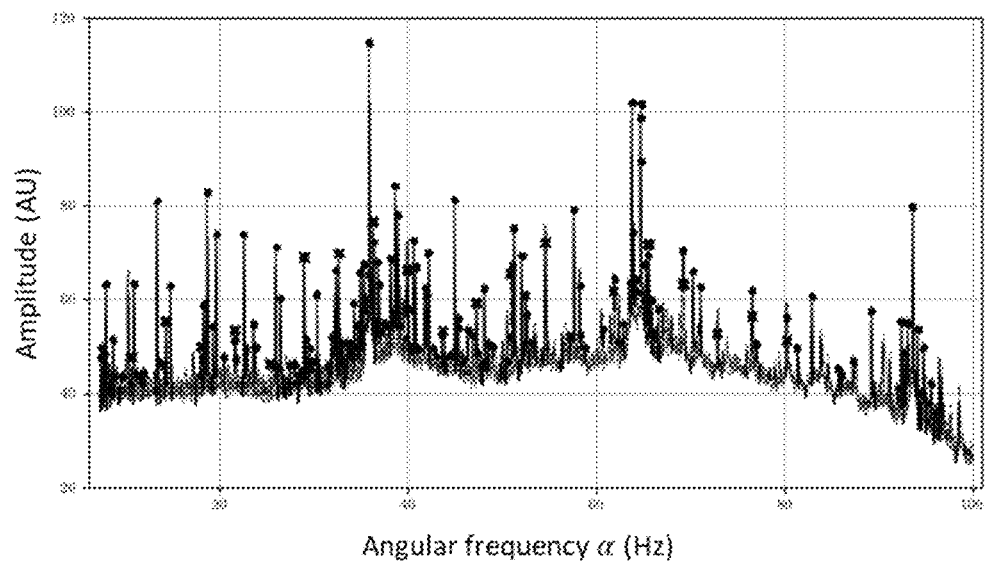

[Fig. 5]
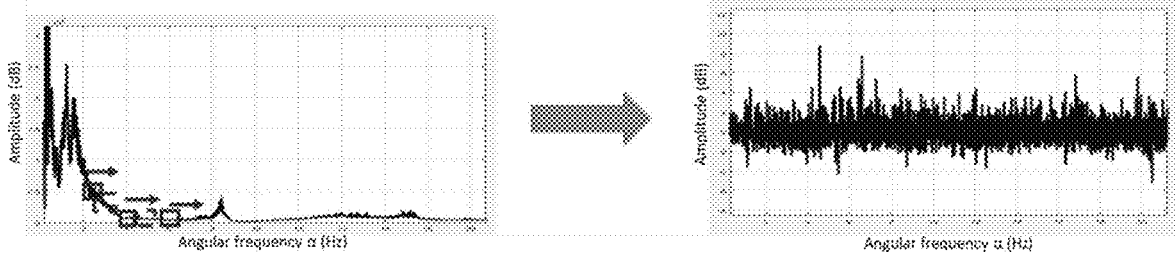
[Fig. 6]
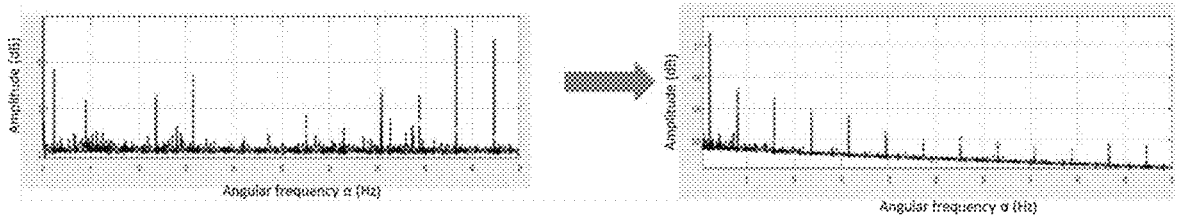
[Fig. 7]
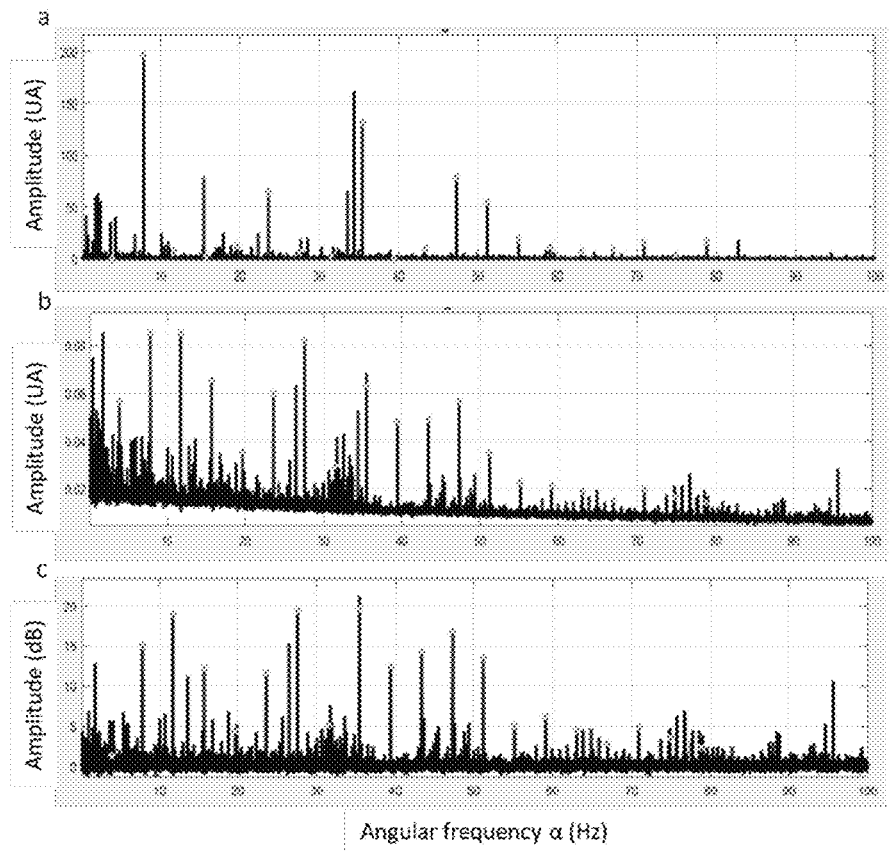

[Fig. 8]
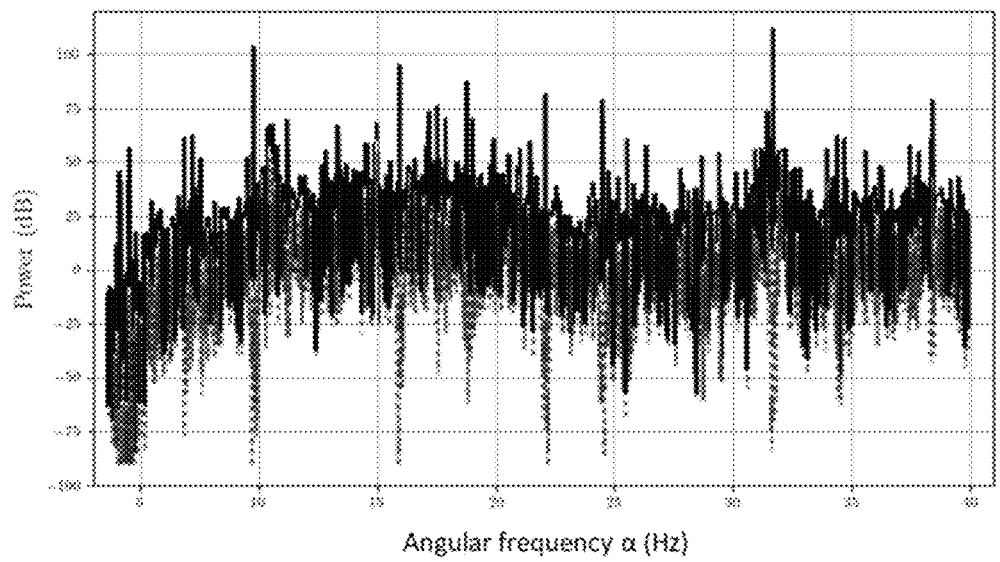
[Fig. 9]
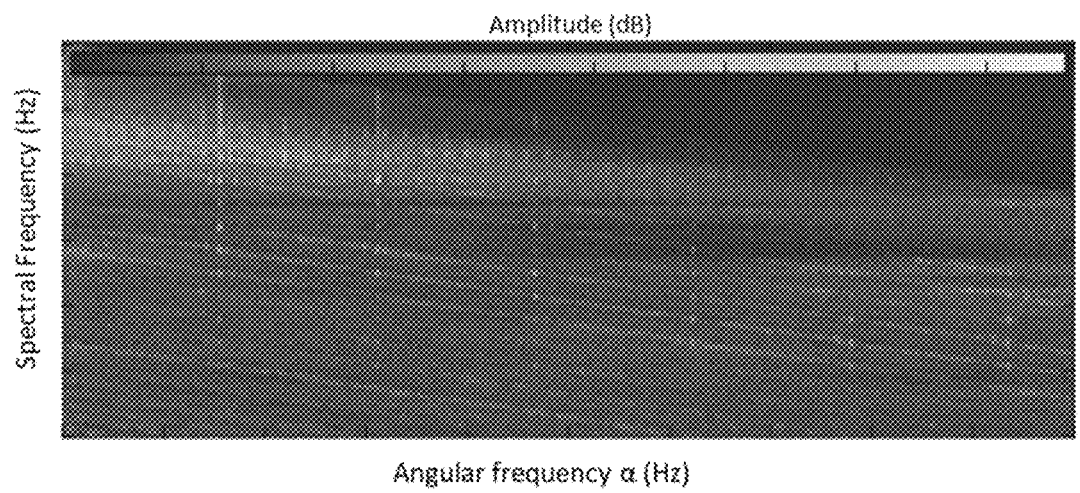
[Fig. 10]
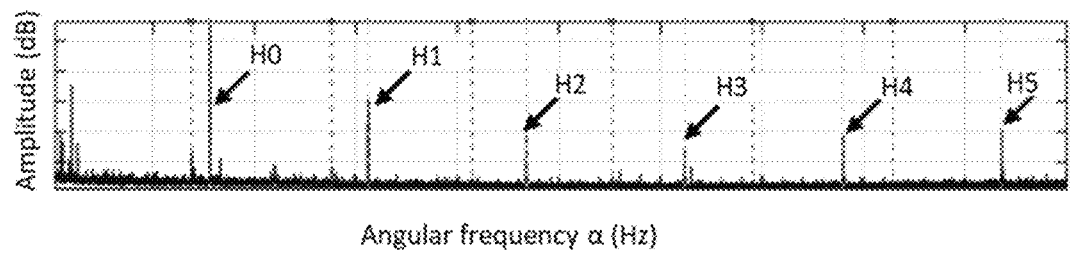

[Fig. 11]
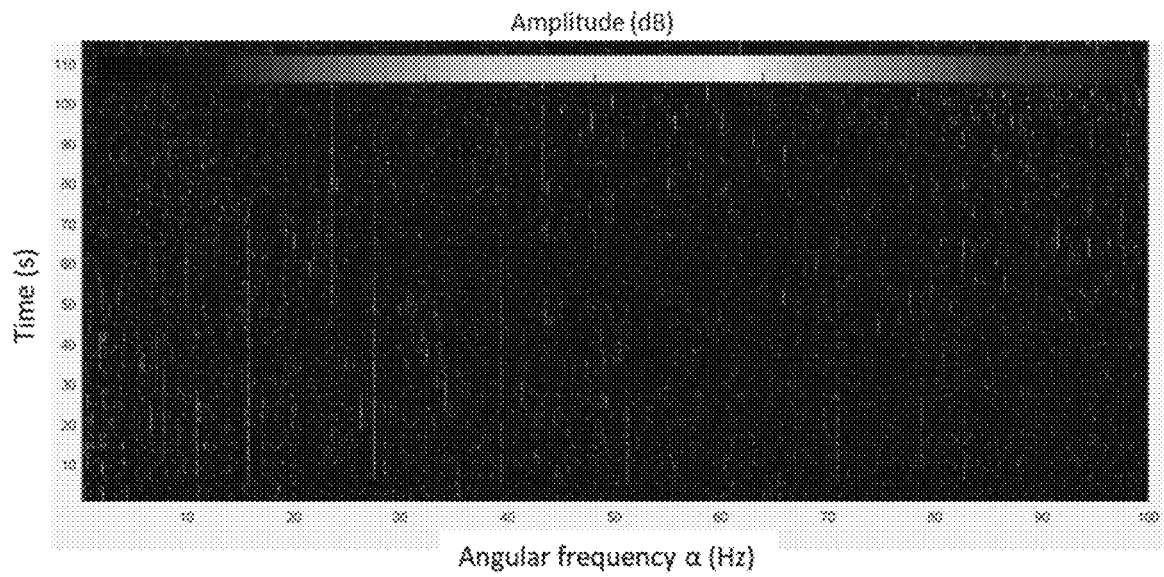
[Fig. 12]
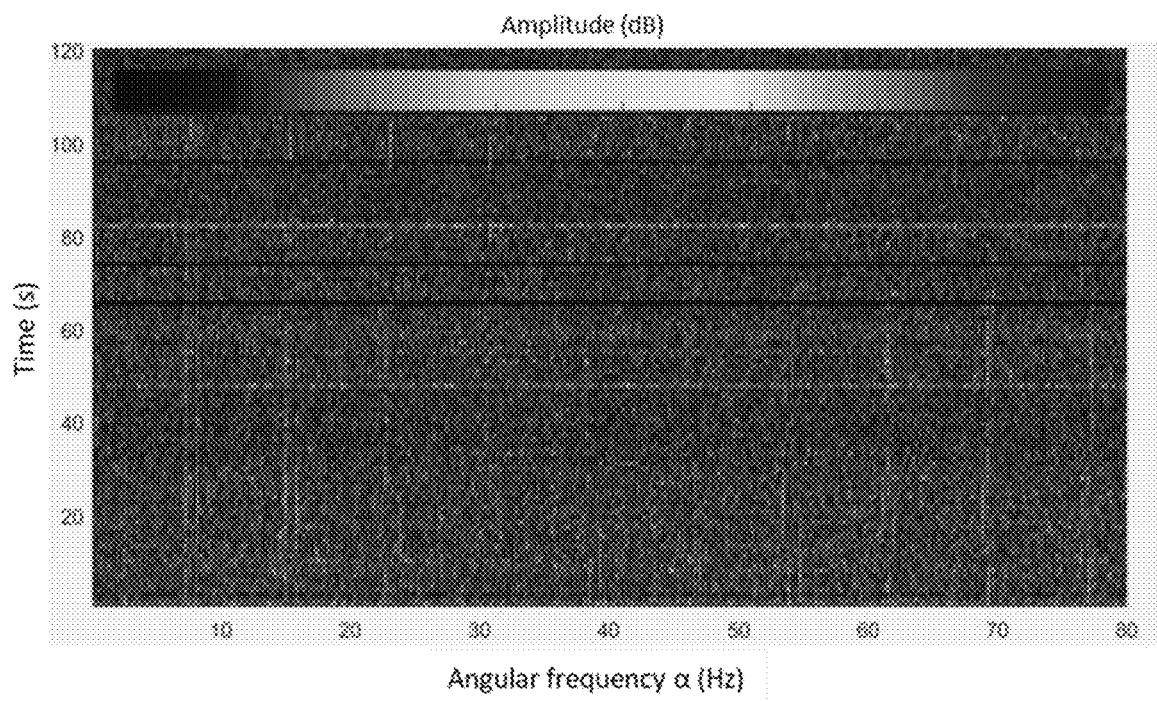

[Fig. 13]
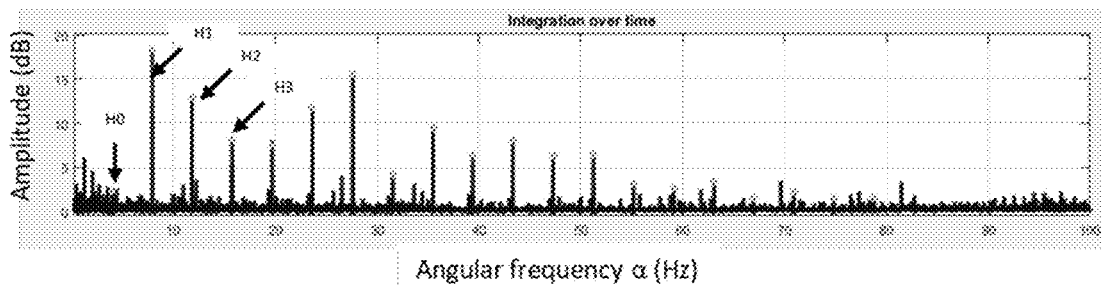
[Fig. 14]
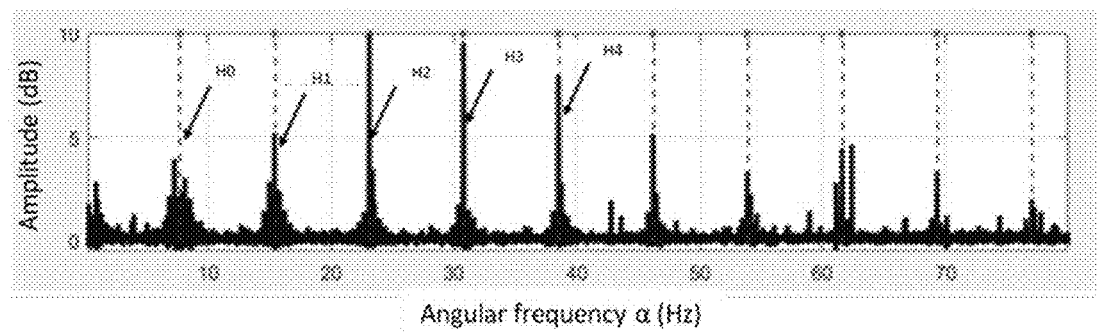
[Fig. 15]
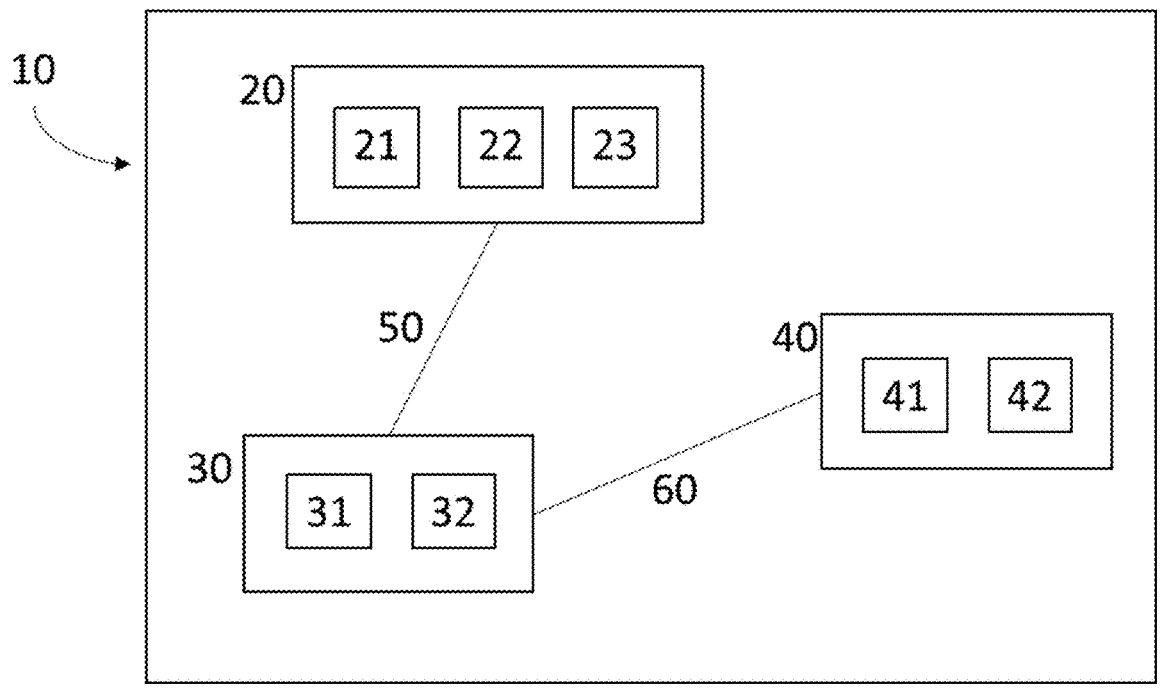

METHOD FOR MONITORING A ROTATING MACHINE IN ORDER TO DETECT A FAULT IN AN AIRCRAFT BEARING

CROSS-REFERENCE TO RELATED APPLICATIONS

This application is the U.S. National Stage of PCT/FR2023/050572, filed Apr. 20, 2023 which in turn claims priority to French patent application number 2203779 filed Apr. 22, 2022. The content of these applications are incorporated herein by reference in their entireties.

TECHNICAL FIELD OF THE INVENTION

The technical field of the invention is that of monitoring rotating machine and more particularly aircraft engine bearings by analysing vibratory signals, and engine power transmission.

This invention relates to a method for monitoring a rotating machine for detecting fault of a bearing.

TECHNOLOGICAL BACKGROUND OF THE INVENTION

The monitoring of aircraft bearings is of prime importance to the transport industry and, in particular, the aeronautics industry. Indeed, bearings are among the most highly stressed and critical mechanical members in a wide range of equipment (compressors, turbojet engines, reducers, etc.). These mechanical components therefore have a high probability of damage, which can cause damage to the aircraft engine and even total failure. Apart from the economic cost, such failures can jeopardise the safety of equipment and users.

Predictive maintenance based on continuous monitoring of the state of health of bearings would make it possible to detect and identify a possible fault in one of the bearings, in order to prevent its damage and/or failure. Replacement of the bearing would therefore be conditional on the result of an analysis using a system enabling such monitoring.

There is a number of methods for monitoring rotating machines, especially by measuring vibrations induced by the operation of the machine and driven elements. However, methods known to the state of the art in this field are difficult to apply to aeronautical machines, in particular aeroplane and helicopter engines. Indeed, monitoring the operation of aircraft engines is made difficult, firstly by the accessibility and overall size of the shaft lines and rotating engines in critical environments, which hampers installation of monitoring systems that should then use few sensors and/or place the sensors at a distance from the bearings being monitored and, secondly, by the fact that the engine speeds of these rotating machines are very high, which greatly modifies statistical nature of the vibratory signals, compared with a low-speed regime.

In particular, bearings in an aircraft are required to rotate at very high speeds, in the same order as the resonant frequency of the system. This mode of operation significantly changes statistical nature of the vibratory sources and makes the vibratory signals, measured in situ, very different from those obtained during a test phase, for example on a commercial test bench. For example, at high speeds, the overlapping of transient waves generated by shocks reduces impulsivity of the fault component, which is not compatible with a large proportion of the methods of the state of the art, which are mainly based on the impulsive nature of signals.

Another difficulty, specific to aircraft operation, is the presence of transient regimes, i.e. significant changes in speed, with phases of very strong acceleration or deceleration that are often abrupt. These are also known as non-steady state regimes. In addition to these highly variable speeds, there are variations in the radial and/or axial loads of the different engine elements. However, methods of the state of the art do not allow such transient operating modes to be taken into account. However, not taking these non-steady state regimes into account can be detrimental. On the one hand, there is no guarantee that the recording in steady-state mode is long enough to allow analysis; on the other hand, vibratory signatures of some bearing faults are likely to emerge more easily in some modes than in others, and scanning several modes could therefore improve probability of detecting weak signals.

In addition, there are monitoring restrictions directly related to the complexity of engines. Herein, assemblies of turbomachines are such that a very large number of vibratory signatures are recorded in the signals, each associated with one of the elements of the engine, for example a gear, a bearing, a fan, a vane, a shaft, a compressor, etc. Even in normal operation, these elements produce significant vibrations that mask vibratory components produced by a faulty bearing and add noise. Conventional vibratory analysis methods are therefore unreliable because source separation is not trivial to implement for this sort of application, especially in case the signal is a non-steady state signal.

In addition to the rotating elements of the turbomachine, other vibratory sources, known as asynchronous sources, make identifying a faulty bearing all the more difficult because they add highly non-steady state components to the signals.

Part of asynchronous sources is directly related to the design of the engine. Indeed, turbomachines generally include two rotation shafts, not rigidly attached, each with a different speed of rotation, with asynchronous operating modes during steady state phases of the engine speed, as well as during acceleration and deceleration phases. These are referred to as speeds of rotation N1 and N2 of the shafts; this is also the case for twin-engine aircraft. These asynchronous operating modes can also generate additional harmonic content which is detrimental to the discrimination of the multiple frequencies associated with the operation of the different rotating elements of the engine in the signal spectrum. Indeed, some harmonic components will overlap or mask each other, resulting in a poor estimate of the operating state of the engine. Furthermore, variability of engine speeds makes it difficult to detect a failing bearing, as the harmonic signature associated with this bearing will also be highly variable. Furthermore, the variability of engine speeds also influences variability in the statistical nature of the vibratory signal.

In addition to the rotating elements of the engines, other asynchronous sources add noise to the vibratory signal through the presence of highly non-steady state components. In fact, when an aircraft engine is operating, there are many sources of asynchronous noise, whether solid, airborne, electromagnetic or thermal. The main sources of noise are the combustion of fuel to move the aircraft, the aerodynamic flow of fluids in the engine and around the apparatus (e.g. floating and turbulence), as well as resonances of the different elements in the engine and the aircraft due to the vibrations generated by the engine. These multiple, predominantly broadband, noise sources mean that the signal-to-noise ratio levels in the acquired vibratory signals are low and it is difficult to differentiate therein the vibratory signature of a faulty bearing from the noise.

The removal or separation of the previously mentioned different sources of noise is not easy to achieve using state of the art methods due to the unique and complex statistical properties of vibratory signals of rotating machines. By way of example, aerodynamic interference is known to have a broadband and random spectral signature, while the signature of fans/vanes is rather cyclic, while shafts and gears are sinusoidal components whose phases depend on the positions of the shafts to which they are mounted.

Monitoring methods based on advanced analysis of time signals and spectrograms are known from the state of the art (for example, FR2952177B1, FR3076348B1 and EP2496921A1). However, these methods do not address the problems posed by aeronautical applications. That is to say, these methods are not, or are only marginally, robust to the non-steady state operating regimes of turbomachines; nor do they allow the particular statistical structure of vibratory signals caused by high speeds of rotation to be taken into account; and they are difficult to apply to signals that are highly noisy from sources of asynchronous origin, producing a low level of signal-to-noise ratio.

There is therefore a need for a means of monitoring a rotating machine that is robust to the high-speed, non-steady state operating regime of the machine, to detect a bearing fault in a complex, high-noise environment.

SUMMARY OF THE INVENTION

The invention offers a solution to the problems previously discussed, by enabling monitoring, by virtue of the measurement of a vibratory signal, of a rotating machine operating at high speeds, so that the vibratory signature of a faulty bearing is discriminated from the vibratory signatures of other elements and from noise generated by the operation of the machine, while taking account of the transient regimes of the engine.

A first aspect of the invention relates to a method for monitoring a rotating machine for the detection of a fault in a bearing, the method comprising the following steps of:
  Acquiring a vibratory signal from the rotating machine measured by a vibration sensor;
  Determining an order-1 spectrogram by order-1 cyclostationary analysis of, the vibratory signal by means of a delta transform and a spectral standardisation;
  Determining an order-2 spectrogram by order-2 cyclostationary analysis of the vibratory signal using an averaged cyclic coherence, a delta transform and a spectral standardisation;
  Detecting a vibratory signature of the bearing fault from the order-1 spectrogram and the order-2 spectrogram.

By "rotating machine", it is meant an engine machine whose engine transforms energy supplied to the engine into a rotational movement, for example through a shaft line. In the context of the invention, this refers especially to aircraft such as aeroplanes or helicopters, but it can also refer to wind turbine engines, bearing vehicle engines, etc.

By "vibration sensor", it is meant a sensor adapted to measure vibrations to which a structure is subjected. For example, it may be an accelerometer-type sensor based on the piezoelectric effect, a laser vibrometer, a capacitive or eddy current displacement sensor, etc.

By "cyclostationary signal», it is meant a signal whose statistical properties periodically vary over time, as opposed to a stationary (steady-state) signal whose statistical properties are invariant over time. This is in particular the case for vibratory signatures of the rotating elements of a shaft line, the harmonic content of which is dependent on the operating speed of the engine. In particular, statistical properties of such signatures will be invariant to rotation cycles, a cycle being one or more periods of rotation of the shaft, while the rotation cycles will have a variability that follows non-steady state of the engine speeds. Thus, by "cyclostationary analysis", it is meant analysis of a signal whose statistical properties vary periodically over time.

By virtue of the invention, it is possible to detect a faulty bearing in the rotating machine by analysing a highly noisy vibratory signal acquired on the machine. The analysis is carried out by studying both deterministic properties, also known as periodic properties, and cyclostationary properties of the harmonic signature of the fault. The method is therefore particularly well adapted to high-speed applications such as helicopter, aeroplane or drone engines, for example for monitoring an accessory gearbox (AGB), equipment supports, transmission systems from an engine to the aeroplane, etc. The method can also be applied to other types of rotating machines, such as car, truck or train axles, or to equipment such as gearboxes, alternators, pumps, aeroplane landing gear wheels, etc.

The method is easily practicable within the scope of an aeronautical application since it requires, at the very least, a single vibration sensor, the dimensions of which are compatible with overall size and compactness issues of aeronautical systems. This means that only a small amount of equipment needs to be installed for the method according to the invention to be operational, and reduces the cost of monitoring. Furthermore, as vibration sensors are more robust to critical environments and more sensitive to high frequencies than speed or position sensors, the method is adapted to an aeronautical application.

The use of a delta transform to form the order-1 spectrogram and the order-2 spectrogram makes it possible to delete sources that interfere with the vibratory signature of the faulty bearing. By way of example, the delta transform can be based on knowledge of the kinematics of the engine shafts to systematically remove these frequency components.

By "spectral standardization", it is meant an operation that makes the spectrum of a zero mean and a unit standard deviation. By virtue of spectral standardisation, it is possible to statistically reduce the order-1 spectrogram, because spectral standardisation reduces and makes spectral properties of the spectrogram uniform. Furthermore, spectral standardisation implicitly whitens the signal spectrogram, which improves the signal-to-noise ratio and compensates for the harmonic content associated with vibration modes and resonances of the engine elements.

These various tools used in the invention therefore make it possible to improve robustness of the detection of the vibratory signature of a faulty bearing in relation to the noise contained in the vibratory signal. As a result, the detection of a bearing fault can be carried out at an early stage, when the very first symptoms appear, and thus avoid a failure of the turbomachine.

Thus, the method according to the invention provides a means of assisting an expert or an operator, for example, to establish a reliable diagnosis of the state of health of bearings of an aircraft, by virtue of the emergence of harmonic signatures representative of bearing faults.

Further to the characteristics just discussed in the previous paragraph, the method according to the first aspect of the invention may have one or more additional characteristics from among the following, considered individually or according to any technically possible combinations.

In one embodiment, the step of detecting the vibratory signature of the faulty bearing comprises identifying the faulty bearing from said vibratory signature.

By virtue of this embodiment, it is possible to facilitate diagnosis of the state of health, by an expert or an operator, of the faulty bearing and of the rotating machine.

In one embodiment, the monitoring method according to the previous embodiment, further comprises a maintenance step of the faulty bearing identified.

By virtue of this embodiment, it is possible to trigger a maintenance operation to repair or change the faulty bearing identified, in order to extend the life time of the rotating machine and prevent a failure of the rotating machine.

In one embodiment, the vibratory signal is acquired over a plurality of different operating phases of the rotating machine.

The interest of analysing the vibratory signal according to different operating phases of the rotating machine is to guarantee diversity of the vibratory signatures acquired and to ensure that, if the rotating machine includes a faulty bearing, its vibratory signature will actually be included in the signal. Indeed, the signature is likely to appear only at specific engine speeds. Thus, the monitoring covers the majority of the operating margin of the aircraft and increases the probability of detecting a bearing fault within the rich frequency content of the signal.

In one embodiment, the order-1 spectrogram and the order-2 spectrogram are determined from a Fourier Transform applied to the vibratory signal over a plurality of successive time windows with a duration of between 0.1 s and 10 s.

By virtue of the analysis of the vibratory signal using small time windows, it is possible to consider that the statistical properties of the vibratory signal, which vary as a function of the different engine speeds, are in steady state over the duration of the time window. Analysis of the vibratory signal thus ensures that variability of the rotating operating speeds of the machine is taken into account. This embodiment also facilitates detection of vibratory signatures of bearing faults by tracking deviations in the characteristic frequencies of the bearing.

In one embodiment, the acquisition step further comprises acquiring a rotating machine speed signal measured by means of a speed sensor.

Measuring a speed signal provides a speed reference at any measurement time. This speed signal can be used herein to resample the vibratory signal according to the operating cycles of the machine. The speed signal can therefore be used to reset the vibratory signal to the engine speed of rotation. In other words, the vibratory signal is used to identify the operating cycles of the machine in the vibratory signal.

In one embodiment, the method further comprises, in the step of determining the order-1 spectrogram, the following steps of:
  For each time window of the plurality of time windows:
    Resampling the vibratory signal from the speed signal to obtain an angular signal;
    Determining an order-1 spectrum by applying a Fourier Transform to the angular signal;
    Determining a corrected order-1 spectrum by applying Delta Transform to the order-1 spectrum;
    Determining a standardised order-1 spectrum by applying spectral standardisation to the corrected order-1 spectrum;
    Determining a flattened order-1 spectrum by applying spectral autocorrelation to the standardised order-1 spectrum;
  Concatenating the flattened order-1 spectra, determined for each time window, to form the order-1 spectrogram.

In one embodiment, the method further comprises, in the step of determining the 1-order spectrogram, the following steps of:
  For each time window of the plurality of time windows:
    Determining a corrected flattened order-1 spectrum by applying a Delta Transform to the flattened order-1 spectrum;
    Determining a reduced order-1 spectrum by applying spectral standardisation to the corrected flattened order-1 spectrum;
the concatenation step being concatenating the reduced order-1 spectra, determined for each time window, to form the order-1 spectrogram.

In one embodiment, the method further comprises, in the step of determining the order-2 spectrogram, the following steps of:
  For each time window of the plurality of time windows;
    Resampling the vibratory signal from the speed signal to obtain an angular signal;
    Deleting the deterministic part of the angular signal to obtain a corrected vibratory signal;
    Determining an order-2 spectrum from the cyclic coherence of the corrected vibratory signal;
    Averaging the order-2 spectrum;
    Determining a flattened order-2 spectrum by applying spectral autocorrelation to the order-2 spectrum averaged;
  Concatenating the flattened order-2 spectra, determined for each time window, to form the order-2 spectrogram.

In one embodiment, the method further comprises, in the step of determining the order-2 spectrogram, the following steps of:
  For each time window of the plurality of time windows:
    Determining a flattened order-2 spectrum corrected by applying Delta Transform to the flattened order-2 spectrum;
    Determining the reduced order-2 spectrum by applying spectral standardisation to the flattened order-2 spectrum corrected;
the concatenation step being concatenating the reduced order-2 spectra, determined for each time window, to form the order-2 spectrogram.

By virtue of the application of autocorrelation, the vibratory signature of the faulty bearing can be made to emerge in the order-1 and order-2 spectrograms, thereby improving detection of the vibratory signature in question.

A second aspect of the invention relates to a system for monitoring a rotating machine to detect a fault in a bearing, the system comprising:
  An acquisition module comprising:
    The vibration sensor;
    A memory; and
    A processor;
  A processing module 30 comprising:
    A memory; and
    A processor;
  Connection means between the acquisition module and the processing module.

A third aspect of the invention relates to a computer program product comprising instructions which, when the program is executed on a computer, cause the same to implement the steps of the method according to the first aspect of the invention.

A final aspect of the invention relates to a computer-readable recording medium comprising instructions which, when executed by a computer, cause the same to implement the steps of the method according to the first aspect of the invention.

The invention and its different applications will be better understood upon reading the following description and upon examining the accompanying figures.

BRIEF DESCRIPTION OF THE FIGURES

The figures are set forth by way of indicating and in no way limiting purposes of the scope of the invention.

FIG. 1 is a block diagram illustrating the sequence of steps in the method according to the invention.

FIG. 2 is an illustration of a sliding time window analysis of a vibratory signal and a speed signal.

FIG. 3 is a spectrum of a vibratory signal acquired on a rotating machine and a theoretical spectrum of kinematics of the rotating machine.

FIG. 4 shows a comparison between a Fourier Transform spectrum and a Delta Transform spectrum of a same vibratory signal.

FIG. 5 illustrates the effect of applying spectral standardisation to a spectrum.

FIG. 6 illustrates the effect of applying spectral autocorrelation to a spectrum.

FIG. 7 is a comparison of the spectra successively processed during a step in the method described in FIG. 1.

FIG. 8 is a comparison of a spectrum of a vibratory signal before and after processing according to a step of the method of FIG. 1.

FIG. 9 shows a cyclic coherence of the random part of the vibratory signal.

FIG. 10 represents the spectrum of the cyclic coherence of FIG. 9 averaged at the time dimension.

FIG. 11 is one example of an order-1 spectrogram determined by the method described in FIG. 1.

FIG. 12 is one example of an order-2 spectrogram determined by the method described in FIG. 1.

FIG. 13 is the spectrum obtained by averaging, at the time dimension, the order-1 spectrogram.

FIG. 14 is the spectrum obtained by averaging, at the time dimension, the order-2 spectrogram.

FIG. 15 is a diagram illustrating a system for implementing the method described in FIG. 1.

DETAILED DESCRIPTION

Unless otherwise specified, a same element appearing in different figures has a single reference.

The present invention relates to a method for monitoring a faulty bearing of a rotating machine by vibratory analysis, for example a bearing of an aircraft engine shaft. The method requires as an input a vibratory signal acquired on the rotating machine during a non-steady state operating phase lasting several seconds. Complementarily, the method can use as an input a measurement of an instantaneous speed of rotation or an instantaneous position of a shaft rigidly attached to the shaft of the bearing being monitored, as well as kinematics of the shafts in proximity to this bearing. Two spectral analyses of the vibratory signal are then carried out in parallel. Preferably, these treatments are applied over a restricted sliding time window (typically one second) of the vibratory signal. The first treatment comprises a series of operations applied to an order-1 spectrum of the vibratory signal in order to delete undesirable harmonics therefrom, to raise the level of detection of a vibratory signature of the faulty bearing and to carry out statistical reduction of the. The second treatment relates to the purely random part of the vibratory signal after deleting the tonal part, and applies a series of operations to order-2 cyclostationary statistics in order to reveal any hidden periodic patterns. At the output, the method provides two spectra, and preferably two spectrograms, bearing the order-1 and order-2 cyclostationary information of the vibratory signal. The vibratory signature of a bearing fault can then be detected and will ultimately serve to identify the bearing including the fault.

The method provided is therefore a support tool for an expert or an operator to diagnose state of health of bearings in a rotating machine and, if necessary, assist in identifying a faulty bearing with a view to maintenance.

By "state of health" of a bearing, or more broadly of a mechanical part, it is meant to refer to the compliance of said bearing with a set of specific requirements, for example from a specification, relating to its design, manufacture and use. When the state of health of the bearing is degraded, for whatever reason, it is referred to as a faulty bearing.

By "faulty bearing», it is meant a bearing whose mechanical or geometric properties have been impaired, resulting in an anomaly, often due to imbalance, when the shaft to which it is assembled is rotated. The impairment may result from a discontinuity in the properties of the bearing material, as a result of hazards occurring during manufacture of the part, or from fatigue of the bearing during use or handling. The material may, for example, have been weakened during the manufacturing process and its use, generating high local stresses in the weakened zone, or following an impact, resulting in a fault. The impairment may furthermore result from an imbalance or a geometric or mechanical deformation of the bearing, which is for example the case when the bearing is subjected to very high stress, as in a turbomachine. The term "fault" therefore covers all forms of impairment that the bearing may undergo: material fault, inclusion, crack, lubricant fault or contamination, alteration of material properties, deformation, misalignment, unbalance, overload, leakage currents, etc. Each type of fault can be detected in a vibratory signal in that it produces a particular vibratory signature.

By "vibratory signature», it is meant a set of harmonics whose frequency distribution is specific to the source of vibrations, for example the signature of a bearing rotated by the shaft to which it is assembled. Furthermore, the harmonic content associated with the bearing, among other things the heights, amplitudes as well as the statistical properties of the frequencies, are specific to the bearing in question. In addition, there may be a relationship or non-linear relationship explaining the frequency distribution of the vibratory signature. Furthermore, the vibratory signature depends on the load applied to the bearing; in particular, the harmonic signature of the bearing may vary with its speed of rotation about the axis of the shaft. As a direct consequence, the vibratory signature of the bearing does not systematically appear in the signal when the bearing is rotated, but only at some engine speeds. The vibratory signature of a bearing is especially included in a spectrum or spectrogram of the vibratory signal, although its amplitude is low compared to the vibratory signatures of other elements in the machine.

By "spectrogram», it is meant the representation over time of the frequency content of one or more signals.

Furthermore, the terms frequency content, harmonic content, harmonic components and harmonics all refer to the set of frequencies (or harmonics) contained in the spectrum of signals, the spectrum of a signal being obtained by applying Fourier transform from the time domain to the frequency domain.

A first aspect of the invention relates to a method for monitoring a rotating machine for the detection of a bearing fault.

The rotating machine is, for example, an aircraft engine including one or more shaft lines enabling energy consumed by the engine to be transformed into rotational movement. The shaft line includes several elements for displacing the aircraft, especially bearings.

The example provided here as a preferred embodiment relates to a bearing of an accessory gearbox (AGB) of a CFM International CFM56 series turbomachine. The AGB includes especially two rotation shafts N1 and N2, each with different operating speeds. The rotation shaft N2 includes at least one faulty bearing whose vibratory signature is detected by virtue of the method 100 according to the invention. The rotation shaft may further include other non-faulty bearings.

FIG. 1 shows a schematic representation of the main steps of the method 100 according to the invention. The method 100 according to the invention includes four main steps and one optional step.

The first step is a step 110 of acquiring a vibratory signal by means of a vibration sensor, for example a piezoelectric accelerometer. The vibratory signal is hereinafter referred to as x(t). The sensor is, for example, placed on a shaft line of the rotating machine or in proximity to said shaft line. Preferably, the sensor is positioned on a fixed member of the rotating machine to be monitored. The sensor may furthermore be at a distance from the bearings being monitored, for example a distance greater than 5 cm. The signal comprises vibrations generated during operation of the rotating machine.

The sampling frequency of the signal is sufficiently high for at least part of the vibratory signature of the faulty bearing to be in the acquired frequency range.

Preferably, the vibratory signal is acquired over a total duration of several seconds, for example over a duration of more than 10 seconds. Furthermore, the vibratory signal is preferably acquired during an operating phase of the rotating machine such that its engine speed is non-steady state, for example during a transient speed phase.

The vibratory signal can also be acquired so as to include several different operating phases of the rotating machine. These may be transient phases, the duration of which may be short, for example less than one second, or long, for example more than one second. These transient phases can especially be acceleration or deceleration phases. Preferably, the vibratory signal includes a set of operating phases of the rotating machine that covers the majority of the operating margin of the rotating machine, i.e. the speeds of rotation, accelerations and decelerations that the rotating machine may experience. This diversity of operating regimes acquired makes it possible to guarantee diversity of the vibratory signatures acquired and to ensure that, if the rotating machine includes a faulty bearing, its vibratory signature will actually be included in the signal.

Acquisition step 110 may also comprise acquiring a speed signal or a position signal. This speed or position signal measures a rotational speed or angular position of a reference shaft rigidly connected to the bearings being monitored. For example, the speed or position sensor may be assembled to, or measure the speed or position of, the shaft that comprises the bearing. For such a signal, the sensor is, for example, a proximity sensor, encoder or tachometer. In the following, the term "speed signal" will be used to refer either to the speed signal or to the position signal. The method 100 according to the invention indeed can use either of the signals without their nature altering the implementation of the method 100. Preferably, the speed signal has the same duration as the vibratory signal. Alternatively, the speed signal may have a longer duration than the vibratory signal. In this preferred embodiment, the speed signal is acquired by a tachometer on the rotation shaft N2 simultaneously with the vibratory signal and for the same duration. This speed signal is noted $N_2(t)$.

Acquisition can be carried out on a test bench, where the rotating machine is isolated, or in situ, when the machine is assembled to the aircraft.

The method 100 according to the invention then includes a step 120 of determining an order-1 spectrogram and a step 130 of determining an order-2 spectrogram. As these two steps are independent of each other, i.e. one does not require a result from the other in order to be implemented, they can be carried out simultaneously.

Steps 120 of determining the order-1 spectrogram and 130 of determining the order-2 spectrogram are preferably order-1 and order-2 cyclostationary analysis steps, respectively, of the vibratory signal in order to obtain the order-1 and order-2 spectrograms, respectively.

Preferably, the acquired vibratory signal is analysed over a plurality of successive reduced time windows. This is also known as analysis by sliding time window or by convolution of the vibratory signal with a windowing function. The aim, in order to obtain order-1 and -2 spectrograms, is to determine order-1 and -2 spectra, respectively, from the vibratory signal of each time window. The time interval of a time window, also called the window size, is between 0.1 second and 10 seconds; preferably this interval is between 0.5 and 2.5 seconds. In the following, $x_i(t)$ and $N_2^i(t)$ refer to the vibratory signal and the speed signal, respectively, contained in the i-th time window. It is possible to apply overlap to successive time windows. In this case, the time interval between each time window is smaller than the size of the window. For example, the time interval between two time windows may be 0.25 second less than the size of a time window.

In the embodiment set forth, the size of a time window is 1 second and there is no overlap. The time interval between two time windows is 1 second.

FIG. 2 shows the vibratory signal (FIG. 2a) and the speed signal (2b) acquired during acquisition step 110. A division of the signals is illustrated here to represent the analysis by sliding time window. The vibratory signal is then broken down into a set of vibratory signals marked $x_0$ to $x_7$. The speed signal is broken down into a set of speed signals of identical duration marked $N_2^0$ to $N_2^7$. In this time representation, the richness and complexity of the vibratory signal content, and therefore the need to analyse this signal in the spectral domain to facilitate its treatment and analysis, are observed.

Step 120 of determining the order-1 spectrogram includes five successive main sub-steps, numbered 121 to 125, and two optional sub-steps, numbered 126 and 127. These steps 121 to 127 are repeated for each of the time segments obtained by convolution of the vibratory signal with the windowing function. Step 120 of determining the order-1 spectrogram also comprises a final step 128.

Sub-step 121 is a step of angularly resampling the vibratory signal $x_i(t)$. Preferably, resampling is performed from the speed signal $N_2^i(t)$ of the shaft N2, for example by interpolation. Resampling may also depend on the type of speed sensor used and its characteristics. Resampling is used to obtain an angular signal.

Resampling can be obtained using the shaft angle N2, itself determined by $\theta_{N2}^i(t)=\int_0^t N_2^i(s)ds$. The angular signal is then denoted $x^i(t(\theta_{N2}^i))$.

In sub-step 122, an order-1 spectrum, denoted $X^i(\alpha)$ where $\alpha$ is a frequency, is then determined from a Fourier Transform (FT) of the angular signal $x^i(t(\theta_{N2}^i))$.

Herein, the order-1 spectrum can be obtained by $X^i(\alpha)=|\Im_{\theta_{N2}\to\alpha}\{x^i(t(\theta_{N2}^i))\}|^2$, where $\Im_{\theta_{N2}\to\alpha}\{*\}$ designates the TF operator. This spectrum can be conventionally obtained using a Fast Fourier Transform (FFT).

An illustration of the spectrum of the vibratory signal is provided in FIG. 3. This spectrum shows all the frequencies contained in the vibratory signal. The frequencies potentially related to the rotation of the AGB shafts, i.e. the fundamental and harmonic frequencies of order greater than 1, are indicated by solid circles at the top of the peaks. Not all potential frequencies are necessarily related to the theoretical dynamics of the system, and so naively deleting all these components risks deforming the spectrum by removing components related to the faulty bearing.

Sub-step 123 is here a step of applying Delta Transform (TΔ) to obtain an corrected order-1 spectrum. Preferably, the TΔ is applied from knowledge of kinematics related to the shaft N2, for example from knowledge of a set $\Omega_{N2}^{ref}$ of shaft frequencies.

The TΔ is applied here to remove the frequency content and vibratory signatures generated by mechanical sources and not related to the bearings of the rotation shaft N2, especially emitted by the shafts and gears of the power transmissions in proximity to the bearing(s) of the shaft being monitored. These frequencies can be known a priori, for example, by means of a numerical dimensional analysis with dedicated software (for example Abaqus, COMSOL or Catia). In this case, sub-step 123 comprises a sub-sub-step of obtaining 123a the set $\Omega_{N2}^{ref}$ of shaft frequencies.

In the present embodiment, 11 frequencies are known and associated with the rotation of the 11 shaft lines of the CFM56 AGB. These 11 frequencies form the set $\Omega_{N2}^{ref}$ of shaft frequencies referenced with N2. Tables 1 and 2 summarise dynamics of the AGB with the 11 frequencies in the set $\Omega_{N2}^{ref}$ of shaft frequencies. It is stated that these frequencies are obtained with a speed of rotation of the shaft N2 of 10000 rpm. In this table, the high-pressure shaft is the shaft N2. The naming F1 tooth (Hz) corresponds to the shaft speed of rotation in Hertz, and the naming F1 tooth (N2) corresponds to the shaft speed of rotation in relation to the high-pressure shaft speed of rotation.

TABLE 1

| | Line 1 | | Line 2 | | Line 3 | N2 tacho visu: 44 | Line 4 | Line 5 |
| | High pressure shaft | | Radial transmission shaft | Horizontal transmission shaft | | Engine alternator | 44 teeth Manual drive shaft | Starter |
| | Downstream | Upstream | Downstream | Upstream | Downstream | Upstream | Downstream | Upstream | Downstream | Upstream | Downstream |
|---|---|---|---|---|---|---|---|---|---|---|---|
| Number of teeth | 47 | 35 | 31 | 32 | 47 | 47 | 47 | 62 | 62 | 61 | 31 |
| Speed of rotation (rpm) | 10000 | | 13429 | | 13009 | | 13009 | | 9862 | | 10023 |
| Tooth F1 (Hz) | 167 | 224 | 224 | 217 | 217 | 217 | 217 | 164 | 164 | 167 | 167 |
| Tooth F1 (N2) | 1.0000 | 1.3429 | 1.3429 | 1.3009 | 1.3009 | 1.3009 | 1.3009 | 0.9862 | 0.9862 | 1,0023 | 1,0023 |
| Bearing frequency (Hz) | | 7833 | | | 6938 | | 10190 | | 10190 | | 10190 | 5179 |
| Bearing (modulo N2) | | 47.0000 | | | 41.6286 | | 61.1420 | | 61,1420 | | 61.1420 | 31.0721 |
| Coincidence frequency (Hz) | | 4.8 | | | 7.0 | | 216.8 | | 3.5 | | 2.7 | 2.3 |

TABLE 2

| | Line 6 Fuel pump | | Line 7 Intermediate | | Line 8 Aeroplane alternator | | Line 9 Intermediate | | Line 10 Hydraulic pump | | Line 11 Lubrication unit |
| | Upstream | Downstream | Upstream | Downstream | Upstream | Downstream | Upstream | Downstream | Upstream | Downstream | Upstream |
|---|---|---|---|---|---|---|---|---|---|---|---|
| Number of teeth | 73 | 73 | 41 | 41 | 55 | 55 | 73 | 44 | 73 | 73 | 44 |
| Speed of rotation (rpm) | 4256 | | 7579 | | 5649 | | 4256 | | 2566 | | 4256 |

TABLE 2-continued

|  | Line 6 Fuel pump | | Line 7 Intermediate | | Line 8 Aeroplane alternator | | Line 9 Intermediate | | Line 10 Hydraulic pump | | Line 11 Lubrication unit |
| --- | --- | --- | --- | --- | --- | --- | --- | --- | --- | --- | --- |
|  | Up-stream | Down-stream | Up-stream | Down-stream | Up-stream | Down-stream | Up-stream | Down-stream | Up-stream | Down-stream | Up-stream |
| Tooth F1 (Hz) | 71 | 71 | 126 | 126 | 94 | 94 | 71 | 71 | 43 | 43 | 71 |
| Tooth F1 (N2) | 0.4256 | 0.4256 | 0.7579 | 0.7579 | 0.5649 | 0.5649 | 0.42560 | 0.4256 | 0.2566 | 0.2566 | 0.4256 |
| Bearing frequency (Hz) | 5179 | | 5179 | | 5179 | | 5179 | | 3121 | | 3121 |
| Bearing (modulo N2) | 31.0721 | | 31.0721 | | 31.0721 | | 31.0721 | | 18.7284 | | 18.7284 |
| Coincidence frequency (Hz) | 2.3 | | 1.7 | | 2.3 | | 1.3 | | 1.0 | | 1.0 |

Possible unbalances and/or imbalances of the different shafts, in particular of the gears and impellers assembled thereon, may generate additional undesirable harmonic content in the order-1 spectrum. It is then necessary to consider all the potential frequencies that may appear, in the order-1 spectrum, in a frequency band [0, $\alpha_{max}$], where $\alpha_{max}$ designates a predefined maximum order. Preferably, this predefined maximum order is higher than the highest of the harmonics associated with the faulty bearing, this highest harmonic being theoretically determinable from the bearing geometry. Alternatively, the predefined maximum order can be at least greater than the p-th harmonic of the faulty bearing, p being an integer greater than or equal to 2, when the Nyquist criterion allows, and preferably greater than or equal to 5. In this case, sub-step 123 comprises a sub-sub-step of obtaining 123b a total set $\Omega_{N2}^{ref}$, subsequent to the sub-sub-step of obtaining 123a the set $\Omega_{N2}^{ref}$ of shaft frequencies.

The total set $\omega_{N2}^{Tot}$ can be defined such that $\Omega_{N2}^{Tot} = \{k\alpha \leq \alpha_{max}, \alpha \in \Omega_{N2}^{ref} \text{ with } k=1, 2, \ldots \}$.

It is, further, possible to restrict the set of potential harmonics to a subset $\Omega_{N2}^{HarmSign}$ that comprises statistically significant harmonics. A harmonic $Y(\alpha)$ of the total set $\Omega_{N2}^{Tot}$, associated with a frequency $\alpha$, is considered significant if, at frequency $\alpha$, a Z-spectrum, i.e. obtained by a Z-transform, associated with the total set $\Omega_{N2}^{Tot}$ exceeds a given statistical threshold $\xi$. In this case, sub-step 123 comprises a sub-sub-step of obtaining 123c the set $\Omega_{N2}^{HarmSign}$ of significant harmonics, subsequent to the sub-sub-step of obtaining 123b the total set $\Omega_{N2}^{Tot}$. The subset $\Omega_{N2}^{HarmSign}$ of the significant harmonics can be defined by $\Omega_{N2}^{HarmSign} = \{\alpha \in \chi_{N2}^{Tot} \text{ and } Z_Y(\alpha) \geq \xi\}$, where $Z_Y(\alpha)$ is the Z-spectrum associated with the harmonics $Y(\alpha)$ of the total $\Omega_{N2}^{Tot}$ set. This statistical threshold $\xi$ is, for example, greater than or equal to 2. Preferably, this statistical threshold is greater than or equal to 4. In practice, the greater this threshold, the greater the guarantee that only the harmonics of the bearing and less noise will be considered. By way of example, the statistical threshold $\xi$ may be equal to 6, in order to satisfy the 6-sigma principle.

By "Z-transform", it is meant an operation for standardising a spectrum, herein the spectrum, denoted Y, associated with the harmonics $Y(\alpha)$ of the total set $\Omega_{N2}^{Tot}$. The standardisation operation consists of centring the spectrum Y by subtracting from it a trend $\mu$, then normalising the centred spectrum $Y_c$ by dividing it by a variance $\sigma$ of the spectrum Y, such that $$Z_Y(\alpha) = \mathcal{Z}\{Y(\alpha)\} = \frac{Y(\alpha) - \mu}{\sigma},$$

where $\mathcal{Z}\{*\}$ designates the spectrum standardisation operator, also known as the TZ operator. The trend is, for example, the mean value or the value of the spectrum Y. Preferably, the trend is a moving median estimated by means of a median filtering operation of the spectrum Y.

Furthermore, in order to guarantee minimum deformation of the order-1 spectrum, sub-step 123 may comprise a sub-sub-step 123d of estimating a corrective value. The corrective value thus serves to correct harmonics in the 1-order spectrum associated with the significant harmonics of the set $\Omega_{N2}^{HarmSign}$ of the significant harmonics. The corrective value may be determined from a statistic of the harmonics surrounding the harmonic of interest. For example, the corrective value may be a median or a mean determined from a trend $\mu_X(\alpha)$ of the neighbouring samples, in the order-1 spectrum, for each significant harmonic. By way of example, some samples to the left and some samples to the right of the significant harmonic sample may be considered to be neighbours of the significant harmonic. The number of samples to the right and the number of samples to the left can be equal. These numbers of samples are, for example, greater than or equal to 5. Preferably, 25 samples on the left and 25 samples on the right are used to determine the corrective value. The corrective value will then be different and adapted for each significant harmonic in the order-1 spectrum.

The corrected order-1 spectrum obtained by TΔ, and denoted $X_\Delta^i(\alpha)$, can therefore be determined from the subset $\Omega_{N2}^{HarmSign}$ of significant harmonics and the corrective value of each significant harmonic such that:

$$X_\Delta^i(\alpha) = \Delta\{X^i(\alpha), \Omega_{N2}^{HarmSign}\} = \begin{cases} \mu_X(\alpha) & \text{if } \alpha \in \Omega_{N2}^{HarmSign} \\ X^i(\alpha) & \text{otherwise} \end{cases}$$

where $\Delta\{X^i(\alpha); \Omega_{N2}^{HarmSign}\}$ designates the TΔ of $X^i(\alpha)$ with respect to the $\Omega_{N2}^{HarmSign}$ subset of significant harmonics. The Delta transform is therefore an operation that deletes harmonics associated with the set $\Omega_{N2}^{HarmSign}$ of significant harmonics from the order-1 spectrum while minimising distortion of said spectrum. Advantageously, correction of the harmonics of the order-1 spectrum corresponding to the significant harmonics makes it possible to preserve continuity and regularity of the order-1 spectrum while removing the frequency components associated with the elements and shafts of the rotating machine other than the bearings of shaft N2.

The order-1 spectrum of the vibratory signal, TΔ obtained, is set forth in FIG. 4. The order-1 spectrum is plotted with the dashed line and the spectrum obtained by a simple TF is plotted with the solid line. The crosses mark the harmonics of the vibratory signature associated with a fault in the outer ring of the bearing of shaft N2. The circles in turn indicate harmonics associated with the known vibratory signatures of the AGB shafts that do not have a bearing fault. It can be noticed that the harmonics related to the kinematics of the accessory gearbox shafts are removed without any visible deformation of the spectrum, while the harmonics related to the bearing fault (which are not multiple integers of these shafts) are retained.

Mechanical spectra can be considered as a random statistical series with a frequency-dependent mean and variance. Based on this definition, the harmonics associated with a vibratory signature, herein a bearing, can be seen as outliers. These outliers are also unidirectional, i.e. they follow a positive direction on the frequency axis. Several factors may be responsible for the frequency variability of these statistics, but the two main factors are:
- dynamics of the mechanical systems, herein the rotating machine, resulting in time correlations which, in the frequency domain, take the form of resonance modes and deformations;
- presence of random noise, strongly correlated with the operation of mechanical systems, which intensifies in some frequency bands, generating a high noise variance.

In all cases, in order to obtain a standard or universal spectrum, it is necessary to compensate for this statistical frequency variability.

To this end, sub-step 124 is a spectral standardisation step for the corrected order-1 spectrum, based on robust statistics, to obtain a standardised order-1 spectrum. This compensates for the spectrum trend (also known as the spectrum mean) and the noise variance, while being robust to the harmonics associated with the outliers. In particular, these outliers form the vibratory signature(s) of the shaft bearing(s) of the rotating machine whose state of health is desired to be diagnosed.

The interest of this standardisation is therefore to flatten the order-1 spectrum in order to compensate for the effects of the mean transfer function of the rotating machine. More precisely, this standardisation makes it possible to reduce energy of the spectrum associated with the resonance modes of the rotating machine, coloured noise, as well as other undesired noise sources to analyse the vibratory behaviour of the shaft N2 bearings.

It may be noticed that, in the case of vibratory signal spectra, outliers strictly emerge on the positive side of the statistical distribution, i.e. on the right-hand side of the frequency axis, which makes it possible to simplify modelling of the statistical properties of the signal spectrum, in this case the order-1 spectrum, with a view to its standardisation.

The spectral standardisation sub-step 124 may thus comprise a sub-sub-step 124a of estimating the trend $\mu_{\Delta X}^i(\alpha)$ of the order-1 spectrum. Preferably, the trend is estimated from the determination of a moving median. For example, this determination of the moving median may be a median filtering operation of the order-1 spectrum which consists in calculating the median value of the order-1 spectrum over the time window such that $\mu_{\Delta X}^i(\alpha)=\text{Medfilt}(X_\Delta^i(\alpha))$ where Medfilt(*) is a median filtering operator.

The spectral standardisation sub-step 124 may thus comprise a sub-sub-step 124b of determining a centred order-1 spectrum $X_{\Delta c}(\alpha)$ from the estimate of the trend $\mu_{\Delta X}(\alpha)$ of the order-1 spectrum. For example, the centred order-1 spectrum is defined such that $X_{\Delta c}^i(\alpha)=X_\Delta^i(\alpha)-\mu_{\Delta X}i(\alpha)=X_\Delta^i(\alpha)-\text{Medfilt}(X_\Delta^i(\alpha))$.

Furthermore, the spectral standardisation sub-step 124 may also comprise a sub-sub-step 124c of determining a dispersion of the frequency series. This dispersion, for example, is calculated on the basis of a mean median deviation of the frequency series of the order-1 spectrum, the interest of which is to provide a robust estimate of the dispersion of the series with regard to outliers. Consequently, the mean median deviation, denoted $\text{EMM}_{\Delta X}(\alpha)$, can be defined as:

$$EMM_{\Delta X}^i(\alpha) = \text{Medfilt}(|X_{\Delta c}^i(\alpha)|) = \text{Medfilt}(|X_\Delta^i(\alpha) - \text{Medfilt}(X_\Delta^i(\alpha))|)$$

Advantageously, according to this equation, the mean median deviation is linearly related to the variance, noted $\sigma_{\Delta X}^i(\alpha)$ of the frequency series such that $\sigma_{\Delta X}^i(\alpha)=k\text{EMM}_{\Delta X}^i(\alpha)$, where k is a predetermined real number, which depends on the distribution of the frequency series.

In practice, this distribution is unknown and it is necessary to estimate it empirically. The spectral standardisation sub-step 124 may therefore comprise a sub-sub-step 124d of empirically estimating a standard deviation, associated with the variance of the frequency series of the order-1 spectrum. This empirical estimation may be implemented using the fact that the outliers strictly emerge on the positive side of the frequency axis. Consequently, a robust standard deviation can be estimated from the right-hand side of the empirical probability distribution function. In other words, this amounts to defining the coefficient k as being equal to a mean. The sub-sub-step 124d of empirically estimating a standard deviation can therefore be a step of determining a standard deviation, or the variance of the frequency series, linearly dependent on the mean median deviation by a coefficient $k^i$ such that $$k^i = \sqrt{\frac{1}{\int \mathfrak{I}_{X_{\Delta c}^i(\alpha)<0} d\alpha} \int (X_{\Delta c}^i(\alpha))^2 \mathfrak{I}_{X_{\Delta c}^i(\alpha)<0} d\alpha},$$

where $\mathfrak{I}_{X_{\Delta c}^i(\alpha)<0}$ designates an indicator function that is 1 when $X_{\Delta c}^i(\alpha)<0$ and 0 elsewhere.

Finally, the spectral standardisation sub-step 124 comprises a sub-sub-step 124e of determining the standardised order-1 spectrum, especially referred to as the Z-spectrum and denoted $X_{Z\Delta}^i(\alpha)$. This standardised order-1 spectrum may, further, be determined from the trend and variance of the order-1 spectrum such that $$X_{Z\Delta}^i(\alpha) = \mathcal{Z}\{X_\Delta^i(\alpha)\} = \frac{X_\Delta^i(\alpha) - \mu_{\Delta X}^i(\alpha)}{\sigma_{\Delta X}^i},$$

where Z{*} designates the spectrum standardisation operator, also referred to as the TZ operator. The interest of using the TZ is therefore to ensure that the standardised order-1 spectrum is defined by a zero mean and a robust and unit standard deviation for any $\alpha$.

An illustration of the effect of spectral standardisation is provided in FIG. 5. It can be seen that the signal dynamics after standardisation flattened, with zero mean and unit standard deviation. Emergence of peaks in the spectrum that were barely visible before standardisation can also be noticed.

Sub-step 125 is a step in which a spectral autocorrelation is applied to obtain a flattened order-1 spectrum, denoted $R_{1X}{}^i(\alpha)$. The application of such an autocorrelation makes it possible to improve detection of the signatures of the bearings of shaft N2 and to reduce energy of the harmonics resulting from kinematics of the rotating machine.

Spectral signatures generated by bearing faults are present in the order-1 spectrum in the form of periodic patterns relative to the shaft N2. In particular, these patterns are peaks located at the frequency or frequencies of the fault, as well as on sidebands of a modulation frequency. The modulation frequency may be the rotation frequency of the shaft of the bearing in question or that of its train (Fundamental Train Frequency or FTF). These vibratory signatures therefore exhibit a regularity, related to periodicity, which it is possible to take advantage of, through spectral autocorrelation, to improve presence of the signature of the bearing(s) of shaft N2, while reducing harmonics generated by other shafts which do not exhibit this kind of periodic pattern relative to shaft N2.

Spectral autocorrelation is, for example, applied according to the relationship $R_{1X}{}^i(\alpha)=R\{X_{ZA}{}^i(\alpha)\}=\int X_{ZA}{}^i(\beta)X_{ZA}{}^i(\beta+\alpha)d\beta$, where $R\{*\}$ designates the spectral autocorrelation operator.

In other words, the application of spectral autocorrelation allows correction of spectral leakage around the peaks of the bearing signature, caused by the sliding nature of the bearing elements.

An illustration of the effect of the spectral autocorrelation operation is provided in FIG. 5. It is observed that the emergence of the vibratory signature of the fault in the outer ring of the shaft N2 bearing clearly emerges from the rest of the spectrum, which has lost some of its dynamic range. The legibility of the spectrum is therefore clearly improved.

At the end of the sub-step 125 of applying spectral autocorrelation, the signatures of the bearings on shaft N2, especially that of the faulty bearing, are clearly amplified compared with the undesired signatures. These bearing signatures can then be used to diagnose the state of health of the shaft N2 and, if applicable, the bearing fault.

However, the application of spectral autocorrelation can amplify some families of harmonics related to the dynamics of the shafts due to modulations or interference between their vibratory signatures; this is the case, for example, of vibratory signatures with a non-negligible spatial coherence between them. Furthermore, the spectrum obtained by spectral autocorrelation retains an artificial statistical tendency related to the bias induced by the spectral autocorrelation operator.

In order to correct this undesired bias and amplification, the method 100 according to the invention can optionally be used to implement sub-step 126, which is a step of applying second $T\Delta$ to the flattened order-1 spectrum. The interest of this step is to obtain a corrected flattened order-1 spectrum, denoted $R_{1\Delta}{}^i(\alpha)$. Preferably, the $T\Delta$ is applied from the knowledge of the kinematics related to the shaft N2 already determined in the sub-step 123 of applying $T\Delta$. In particular, the second $T\Delta$ can be implemented on the basis of the subset $\Omega_{N2}{}^{HarmSign}$ of the significant harmonics, previously determined in sub-step 123 of applying the $T\Delta$, and the corrective value of each significant harmonic such that $R_{1\Delta}{}^i(\alpha)=\Delta\{R_1{}^i(\alpha);\Omega_{N2}{}^{HarmSig}\}$. It is stated that $\Delta\{*\}$ designates the same $T\Delta$ operator as in sub-step 123.

The interest of this step 126 of applying the second $T\Delta$ is to delete all or some of the families of undesired harmonics, related to the kinematics of the shafts, which may appear by applying the spectral autocorrelation transform in the previous step.

The method 100 according to the invention can also implement sub-step 127, which is a step of applying, to the corrected flattened order-1 spectrum, a second spectral standardisation in order to determine a reduced order-1 spectrum, denoted $Z_1{}^i(\alpha)$. The interest of this sub-step is, especially, to flatten the corrected flattened order-1 spectrum $R_{1\Delta}{}^i(\alpha)$, in order to compensate for the bias induced by the application of spectral autocorrelation. This second application of spectral standardisation also makes it possible to make the order-1 spectrum statistically universal, i.e. whose statistical properties are comparable to the statistical properties of other standardised spectra, for example obtained for the same engine under other measurement conditions such as a different measurement bench.

Preferably, spectral standardisation is performed by applying second TZ, as described in the sub-sub-steps of spectral standardisation sub-step 124.

In this case, sub-step 127 comprises a sub-sub-step 127a of estimating the trend $\mu_{R1}(\alpha)$ of the corrected flattened order-1 spectrum, preferably from determining a moving median. Determining the moving median may be a median filtering operation, of the corrected flattened order-1 spectrum, which consists in calculating the median value of the corrected flattened order-1 spectrum, over the time window, such that $\mu_{R1}{}^i(\alpha)=\text{Medfilt}(R_{1\Delta}{}^i(\alpha))$, where Medfilt(*) is a median filtering operator.

Sub-step 127 then comprises a sub-sub-step 127b of determining a centred corrected flattened order-1 spectrum $R_{1\mu}{}^i(\alpha)$ from the trend estimate $\mu_{R1}(\alpha)$ of the corrected flattened order-1 spectrum. For example, the centred corrected flattened order-1 spectrum is defined such that $R_{1\mu}{}^i(\alpha)=R_{1\Delta}{}^i(\alpha)-\mu_{R1}{}^i(\alpha)=R_{1\Delta}{}^i(\alpha)-\text{Medfilt}(R_{1\Delta}{}^i(\alpha))$.

Furthermore, the spectral standardisation sub-step 127 may also comprise a sub-sub-step 127c of determining a dispersion of the frequency series. This dispersion, for example, is calculated from a mean median deviation of the frequency series of the corrected flattened order-1 spectrum, the advantage of which is that it is a robust estimate with regard to outliers. Consequently, the mean median deviation, denoted $\text{EMM}_{R1}{}^i(\alpha)$, can be defined as:

$$EMM_{R1}^i(\alpha) = \text{Medfilt}(|R_{1\Delta}^i(\alpha)|) = \text{Medfilt}(|R_{1\Delta}^i(\alpha) - \text{Medfilt}(R_{1\Delta}^i(\alpha))|)$$

Advantageously, according to this equation, the mean median deviation is linearly related to the variance, noted $\sigma_{\Delta R}(\alpha)$ of the frequency series such that $\sigma_{R1}{}^i(\alpha)=l\text{EMM}_{R1}{}^i(\alpha)$, where l is a predetermined real number, which depends on the distribution of the frequency series.

As with the order-1 spectrum, in sub-step 124 the distribution associated with the corrected flattened order-1 spectrum is not known and has to be estimated. The spectral standardisation sub-step 127 may therefore comprise a sub-sub-step 127d of empirically estimating a standard deviation, associated with the variance of the frequency series of the corrected flattened order-1 spectrum. This empirical estimate can be implemented, as in sub-step 124, using the fact that the outliers strictly emerge on the positive side of the frequency axis. Consequently, a robust standard deviation can be estimated from the right-hand side of the empirical probability distribution function. In other words, this amounts to defining the coefficient 1 as being equal to a mean. The sub-sub-step 127d of empirically estimating a standard deviation can therefore be a step of determining a standard deviation, or the variance of the frequency series, linearly dependent on the mean median deviation by a coefficient $l^i$ such that $$l^i = \sqrt{\frac{1}{\int \mathfrak{I}_{-R^i_{1\Delta}(\alpha)<0} d\alpha} \int \left(R^i_{1\Delta}(\alpha)\right)^2 \mathfrak{I}_{-R^i_{1\Delta}(\alpha)<0} d\alpha},$$

where $\mathfrak{I}_{R_{1\Delta}^i(\alpha)<0}$ designates an indicator function that is 1 when $R_{1\Delta}^i(\alpha)<0$ and 0 elsewhere.

The spectral standardisation sub-step 127 comprises a sub-sub-step 127e of determining the reduced order-1 spectrum denoted $Z_1^i(\alpha)$. This reduced order-1 spectrum can, furthermore, be determined from the trend and variance of the corrected flattened order-1 spectrum such that:

$$Z_1^i(\alpha) = \mathcal{Z}\{R_{1\Delta}^i(\alpha)\} = \frac{R_{1\Delta}^i(\alpha) - \mu_{R1}^i(\alpha)}{\sigma_{R1}^i(\alpha)},$$

where Z{*} designates the spectrum standardisation operator, also called the TZ operator. The interest of using the TZ is, again, to guarantee that the reduced order-1 spectrum is defined by a zero mean and a robust and unit standard deviation for any $\alpha$.

An illustration of the spectra obtained at different sub-steps of step 120 of determining the order-1 spectrum is provided in FIG. 7. Herein, FIG. 7.a is the order-1 spectrum obtained by T$\Delta$; FIG. 7.b is the flattened order-1 spectrum after spectral autocorrelation; and FIG. 7.c is the reduced order-1 spectrum obtained at the end of sub-step 127. In the spectra of FIG. 7, the black circles indicate positions of the harmonics of the vibratory signature of the faulty bearing. These different representations show the importance of the method according to the invention for improving emergence of the vibratory signature of the faulty bearing in the order-1 spectrum.

Finally, sub-step 128 is a step of concatenating the reduced order-1 spectra to form the order-1 spectrogram. Concatenation is carried out by juxtaposing the reduced 1-order spectra in chronological order in the vibratory signal. The order-1 spectrogram, denoted $Z_1(i, \alpha)$, such that $Z_1(i, \alpha)=Z_1^i(\alpha)$; i=0, 1, . . . . T−1, where T is the number of time windows.

The order-1 spectrogram provides complete information on the cyclostationary statistical content of the bearings, at order-1, for all the regimes swept during the acquisition.

Advantageously, considering several operating regimes of the rotating machine significantly improves emergence and detectability of faults.

Step 130 of determining the order-2 spectrogram includes five successive main sub-steps, numbered 131 to 135, and two optional sub-steps, numbered 136 and 137. These steps 131 to 137 are repeated for each of the time segments, obtained by convolution of the vibratory signal with the windowing function. Step 130 of determining the order-2 spectrogram also comprises a final step 138.

Sub-step 131 is a step of angularly resampling the vibratory signal $x_i(t)$. Preferably, resampling is carried out on the basis of the speed signal $N_2^i(t)$ of the shaft N2. Resampling is used to obtain an angular signal.

Resampling can be achieved using the angle of the shaft N2, itself determined by $\theta_{N2}(t)=\int_0^t N_2^i(s)ds$. The angular signal is then denoted $x^i(t(\theta_{N2}))$.

Sub-step 132 is a step of deleting the deterministic part of the angular signal $x_i(t(\theta_{N2}))$. The interest of this step is to delete the angularly periodic part of the signal independently of the source of this deterministic part. In other words, this step makes it possible to estimate the random part of the signal, especially called the residual signal and denoted $r^i(t)$, by deleting its deterministic part.

The means for obtaining the residual signal may be a tool known in the literature, for example, based on the design of a Wiener filter.

Preferably, the tool for estimating the residual signal is so-called "Frequency-Domain Self-Adaptive Noise Cancellation" or FD-SANC method (Antoni, R. B. Randall, *Unsupervised noise cancellation for vibratory signals: part II-a novel frequency-domain algorithm, Mechanical Systems and Signal Processing*, Volume 18, Issue 1, 2004, Pages 103-11). The interest of the FD-SANC method is that it is efficient, fast and completely blind to the sources of the deterministic part of the signal. The FD-SANC method is based on the design of an optimal Wiener filter, denoted h(t), which maximises the signal-to-noise ratio of the harmonics in the least-squares sense. The residual signal $r^i(t)$ is then written as a simple convolution between the signal $x_i(t)$ and the Wiener filter h(t) such that $r^i(t)=\int h(s)x^i(t-s)d$.

FIG. 8 compares the residual signal (dashed line) obtained by FD-SANC with the angular signal (solid line). It can be observed that the FD-SANC algorithm estimates and removes most of the harmonics, related to the deterministic signal, present in the spectrum.

Sub-step 133 is then a step of determining cyclic coherence of the residual signal. Cyclic coherence is a powerful tool for detecting cyclostationary components in a signal, even when the signal-to-noise ratio is low.

Cyclic coherence is determined from an estimate of a cyclic correlation of the signal, herein the residual signal. Accordingly, the sub-step 133 of determining the cyclic coherence may comprise a sub-sub-step 133a of determining the cyclic correlation of the residual signal. Preferably, the cyclic correlation, noted $S_{2r}^i(\alpha, f)$, of the residual signal is estimated from a double TF of an autocorrelation function on the residual signal such that $$S_{2r}^i(\alpha, f) = \mathcal{F}_{t\to\alpha \atop \tau\to f}\{E\{r^i(t)r^i(t-\tau)\}\},$$

where E{*} is the mathematical expectation operator and $\tau$ is the time offset. As a reminder, $$\mathcal{F}_{t\to\alpha \atop \tau\to f}\{*\}$$

is the TF operator and $\alpha$ and f are two frequencies.

The sub-step 133 of determining the cyclic coherence may then comprise a sub-sub-step 133b of estimating cyclic coherence of the residual signal from the cyclic correlation of the residual signal. Preferably, the cyclic coherence, noted $\gamma_{2r}^i(\alpha, f)$, is obtained by a spectral normalisation such $$\gamma_{2r}^i(\alpha, f) = \frac{S_{2r}^i(\alpha, f)}{\left[S_{2r}^i(f) S_{2r}^i(f+\alpha)\right]^{1/2}}.$$

FIG. 9 shows the cyclic coherence determined from the residual signal for the CFM56 AGB. This bi-spectral distribution is a function of the N2 order (horizontal axis) and the absolute spectral frequency in Hertz (vertical axis. Abundance of vertical spectral lines which are purely cyclostationary order-2 components in the signal are noticed.

Sub-step 134 is a step of averaging cyclic coherence. The interest is that the averaged cyclic coherence is a spectral representation summarising the order-2 cyclostationary cyclic content of the residual signal. Preferably, the averaged cyclic coherence, noted $C_r^i(\alpha)$, is calculated from an integral of the square amplitude of the cyclic coherence. For example, the cyclic coherence can be averaged such that $$C_r^i(\alpha) = \frac{2}{F_s} \int_0^{F_s/2} |\gamma_{2r}^i(\alpha, f)|^2 df,$$

where $F_s$ is the sampling frequence of the vibratory signal.

FIG. 10 sets forth the averaged cyclic coherence of the residual signal, where the distribution of the integration of the squares of the amplitudes, of the distribution of the random signal, is represented with respect to the spectral frequency axis. Indications H0 to H5 identify harmonics emerging from the signature of the faulty bearing, in this case the outer ring of shaft N2, enabling the same type of fault to be detected on the other shaft.

Sub-step 135 is a step of applying spectral autocorrelation to obtain a flattened order-2 spectrum. As with sub-step 125, the interest of applying spectral autocorrelation is to improve detection of the bearing signatures of shaft N2 and to reduce energy of the harmonics resulting from kinematics of the rotating machine.

Obtaining the flattened order-2 spectrum, noted $R_2^i(\alpha)$, is preferably implemented in the same way as for sub-step 125. Herein, spectral autocorrelation can be applied according to the relationship $R_{2X}^i(\alpha) = R\{C_r^i(\alpha)\} = \int C_r^i(\beta) C_r^i(\beta+\alpha) d\beta$, where R{*} designates, once again, the spectral autocorrelation operator.

It is to be noted that, unlike the step 120 of determining the order-1 spectrum, the step 130 of determining the order-2 spectrum does not necessarily comprise a standardisation operation. Indeed, the order-2 spectrum is already flat due to its cyclic coherence properties. This is because cyclic coherence implicitly includes a spectrum whitening operation. Consequently, the step 130 of determining the order-2 spectrum may comprise an intermediate step, before or after the sub-step 135 of applying spectral autocorrelation, but this would not improve emergence of the signature(s) of the bearing(s).

Sub-step 136 is an optional step of applying TΔ, from the flattened order-2 spectrum to obtain a corrected flattened order-2 spectrum. The interest of this step is, for the same reasons as discussed for sub-step 126, to correct the undesired bias and amplification brought about by the application of the autocorrelation operator. Indeed, it is reminded that the application of spectral autocorrelation may amplify some families of harmonics related to the dynamics of shafts due to modulations or interference between their vibratory signatures; and that the spectrum obtained by spectral autocorrelation retains an artificial statistical tendency related to the bias induced by the autocorrelation operator.

Preferably, the sub-step 136 of applying TΔ is implemented in a similar way to sub-step 126. In particular, the application of the TΔ can be implemented on the basis of the subset $\Omega_{N2}^{HarmSign}$ of the significant harmonics, determined in the TA application sub-step 123, and the corrective value of each significant harmonic. The flattened order-2 spectrum corrected, denoted $R_{2\Delta}^i(\alpha)$, can be obtained such that $R_{2\Delta}^i(\alpha) = \Delta\{R_2^i(\alpha); \Omega_{N2}^{HarmSign}\}$. It is stated that $\Delta\{*\}$ designates the same TΔ operator as that of sub-step 123 and sub-step 126.

Sub-step 137 is an optional step of applying spectral standardisation to the corrected flattened order-2 spectrum to obtain a reduced order-2 spectrum. The interest of this step, as for sub-step 127, is to flatten the order-2 spectrum in order to compensate for the bias induced by the application of spectral autocorrelation. This spectral standardisation additionally makes it possible to make the order-2 spectrum statistically universal, i.e. whose statistical properties are comparable to the statistical properties of other standardised spectra, for example obtained for a same engine under other measurement conditions such as a different measurement bench.

Preferably, spectral standardisation is implemented by applying TZ, as described in step 120 of determining the order-1 spectrum.

In this case, sub-step 137 comprises a sub-sub-step 137a of estimating the trend $\mu_{R2}(\alpha)$ of the corrected flattened order-2 spectrum, preferably from the determination of a moving median. The determination of the moving median may be a median filtering operation, of the corrected flattened order-2 spectrum, which consists in calculating the median value of the flattened order-2 spectrum corrected, over the time window, such that $\mu_{R2}^i(\alpha) = \text{Medfilt}(R_{2\Delta}^i(\alpha)$, where Medfilt(*) is a median filtering operator.

Sub-step 137 then comprises a sub-sub-step 137b of determining a centred corrected flattened order-2 spectrum $R_{2\mu}^i(\alpha)$ from the trend estimate $\mu_{R2}^i(\alpha)$ of the flattened order-2 spectrum corrected. For example, the centred corrected flattened order-2 spectrum is defined such that $R_{2\mu}^i(\alpha) = R_{2\Delta}^i(\alpha) - \mu_{R2}^i(\alpha) = R_{2\Delta}^i(\alpha) - \text{Medfilt}(R_{2\Delta}^i(\alpha))$.

Furthermore, the spectral standardisation sub-step 137 may also comprise a sub-sub-step 137c of determining a dispersion of the frequency series. This dispersion, for example, is calculated on the basis of a mean median deviation of the frequency series of the flattened order-2 spectrum corrected, the interest of which is that it is a robust estimate with regard to outliers. Consequently, the mean median deviation, denoted $EMM_{R2}^i(\alpha)$, can be defined as:

$$EMM_{R2}^i(\alpha) = \text{Medfilt}(|R_{2\Delta}^i(\alpha)|) = \text{Medfilt}(|R_{2\Delta}^i(\alpha) - \text{Medfilt}(R_{2\Delta}^i(\alpha))|)$$

Advantageously, according to this equation, the mean median deviation is linearly related to the variance, noted $\sigma_{R2}^i(\alpha)$ of the frequency series such that $\sigma_{R2}^i(\alpha) = l EMM_{R2}^i(\alpha)$, where l is a predetermined real number, which depends on the distribution of the frequency series.

As with the order-1 spectrum, in sub-step 124 and sub-step 127, the distribution associated with the flattened order-2 spectrum corrected is not known and has to be estimated. The spectral standardisation sub-step 137 may therefore comprise a sub-sub-step 137d of empirically estimating a standard deviation, associated with the variance of the frequency series of the corrected flattened order-2 spectrum. This empirical estimation can be implemented, as in sub-step 124, using the fact that the outliers strictly emerge on the positive side of the frequency axis. Consequently, a robust standard deviation can be estimated from the right-hand side of the empirical probability distribution function. In other words, this amounts to defining the coefficient g as being equal to a mean. The sub-sub-step 137d of empirically estimating a standard deviation can therefore be a step of determining a standard deviation, or the variance of the frequency series, linearly dependent on the mean median deviation by a coefficient $g^i$ such that $$g^i = \sqrt[2]{\frac{1}{\int \Im_{-R_{2\Delta}^i(\alpha)<0} d\alpha} \int \left(R_{2\Delta}^i(\alpha)\right)^2 \Im_{-R_{1\Delta}^i(\alpha)<0} d\alpha},$$

where $\Im_{X_{\Delta c}^i(\alpha)<0}$ designates an indicator function that is 1 when $R_{2\Delta}^i(\alpha)<0$ and 0 elsewhere.

The spectral standardisation sub-step 137 comprises a sub-sub-step 137e of determining the reduced order-2 spectrum denoted $Z_2^i(\alpha)$. This reduced order-2 spectrum can, furthermore, be determined from the trend and variance of the corrected flattened order-2 spectrum such that:

$$Z_2^i(\alpha) = \mathcal{Z}\{R_{2\Delta}^i(\alpha)\} = \frac{R_{2\Delta}^i(\alpha) - \mu_{R2}^i(\alpha)}{\sigma_{R2}^i(\alpha)},$$

where Z{*} designates the spectrum standardisation operator, also known as the TZ operator. The interest of using the TZ is, again, to ensure that the reduced order-1 spectrum is defined by a zero mean and a robust and unit standard deviation for any α.

Finally, sub-step 138 is a step of concatenating the reduced order-2 spectra to form the order-2 spectrogram. Concatenating is carried out by juxtaposing the reduced order-2 spectra in their chronological order in the vibratory signal. The order-1 spectrogram, denoted $Z_2$(i, α), such that $Z_2$(i, α)=$Z_2^i(\alpha)$; i=0, 1, . . . . T−1, where T is the number of time windows.

The order-2 spectrogram provides complete information on the cyclostationary statistical content of the bearings, at order-2, for all the regimes swept during the acquisition.

Advantageously, the fact of considering several operating regimes of the rotating machine significantly improves emergence and detectability of faults.

The fourth step of the method 100 according to the invention is a step 140 of detecting a vibratory signature of the bearing fault. Detection is especially carried out on the basis of the order-1 spectrogram and the order-2 spectrogram.

FIGS. 11 and 12 show the order-1 and order-2 spectrograms determined from the AGB vibratory signal, in this case acquired over 115 seconds. The vibratory signature of the faulty bearing is apparent in these spectrograms and can be unambiguously identified by the white vertical lines. The faulty bearing can then be identified on the basis of the signature detected, enabling reliable evaluation of the state of health of the bearing.

Detection and identification of a faulty bearing enables early diagnosis of the occurrence of a bearing fault, in order to trigger immediate maintenance and prevent the risk of failure of the rotating machine. The method provided therefore makes it possible to extend the lifetime of the machine.

By way of illustration, the general case of a bearing fault signature comprising the fault frequency $\alpha_f$ and its multiple harmonics modulated by a frequency $\alpha_m$ is considered:

In the case of a bearing element fault signature, for example, the frequency $\alpha_f$ is the bearing element characteristic frequency (BSF—Ball Spin Frequency) while $\alpha_m$ is the train frequency (FTF).

For an outer race fault, the signature is generally materialised by harmonics without sidebands, and $\alpha_f$ will be the BPFO (Ball-Pass Frequency on the Outer race).

For an inner ring fault, the frequency $\alpha_f$ is the characteristic frequency of the inner ring fault, while am is the shaft rotation frequency.

$$D(\alpha_f, \alpha_m; N_f, N_m) = \{N_f\alpha_f + n_m\alpha_m/n_f = 1 \ldots N_f, n_m = \pm 1, \ldots \pm N_m\}$$

denotes the set of frequencies defining a bearing fault signature. This set is a function of the fault frequency $\alpha_f$ and a potential modulation frequency $\alpha_m$. Thus, this signature is parameterised by the number of harmonics $N_f$ and sideband pairs $N_m$ set a priori by the operator.

It is possible to define an indicator associated with a given type of fault (associated with the set D), for example as being the mean of the harmonics:

$$I(Z, D) = \frac{1}{\text{card } \{D\}} \sum_{\alpha \in D_{exc}} Z(\alpha)$$

The value of this indicator is then compared to a threshold, for example Threshold=6 (i.e. this signature has an emergence in the spectrum 6 times greater than the standard deviation). If I(Z, D)>Threshold the fault is present, otherwise the fault is absent.

Detection of a faulty bearing can then be implemented by means of an automatic detection algorithm implementing the previous threshold comparison. Alternatively, it is possible to use abnormal spectral signature recognition software based on a reference signature.

It is also possible to use a machine learning algorithm to carry out the detection; this may be a supervised or unsupervised learning algorithm; the algorithm may, furthermore, be based on a database of reference signatures or predetermined thresholds of faulty and/or non-faulty bearings. This database may be constructed on the basis of theoretical or empirical knowledge of the dynamics of faulty or non-faulty bearings. The detection can further include issuing an alert containing identification information to identify the faulty bearing, for example in the form of an identification number associated with the bearing. The alert is, for example, issued to an operator or an expert. This alternative embodiment makes it easier for an expert or an operator to diagnose the state of health of the faulty bearing and its impact on the state of health of the rotating machine. It also enables a large number of vibratory signals and/or signatures to be analysed simultaneously, especially to improve early detection of faults. Finally, this alternative enables detection to be carried out on the basis of quantitative criteria, for example in relation to a reference system or a learning tool. The interest here is that only criteria that are objective and not subject to operator analysis bias are used.

Alternatively, the detection can be carried out by the operator or expert on the basis of their knowledge of vibratory analysis and the specific requirements, for example in terms of safety for the rotating machine. Advantageously, the order-1 and order-2 spectrograms make it easier to read the vibratory signatures of the bearings. In fact, the order-1 and order-2 spectrograms show harmonic distributions, herein in the form of a vibratory signature, with a degree of significance evaluated by the number of standard deviations in relation to the background noise. The operator or expert can thus easily analyse and interpret these spectrograms in order to detect a faulty bearing as well as its nature by observing said spectrograms.

As each vibratory signature of a faulty bearing is different, depending on the nature of the fault or faults in said bearing, the method 100 advantageously enables the nature of the fault in said bearing to be detected. Detection of the bearing fault then enables the state of health of the bearing to be evaluated. The identification information may, in this case, also comprise information relating to the nature of the bearing fault, for example in the form of key words to summarise the nature of the fault.

The detection step 140 may also comprise a step of averaging the order-1 and order-2 spectrograms. For example, an averaged order-1 spectrogram, denoted $\overline{Z}_1(\alpha)$, is determined such that $\overline{Z}_1(\alpha)=\Sigma_{i=0}^{T-1}Z_1(i, \alpha)$; i=0, 1, . . . . T−1, and an averaged order-2 spectrogram, denoted $\overline{Z}_2(\alpha)$, is determined such that $\overline{Z}_2(\alpha)=\Sigma_{i=0}^{T-1}Z_2(i, \alpha)$. Detection of the faulty bearing can, optionally, be implemented from the averaged order-1 and order-2 spectrograms.

FIGS. 13 and 14 show the averaged order-1 and order-2 spectrograms for the detection of the faulty bearing of the CFM56 AGB. Indicators H0 to H3 on the order-1 spectrogram (FIG. 13) and indicators H0 to H4 on the order-2 spectrogram (FIG. 14) identify specific harmonics of the faulty bearing on shaft N2. This representation also allows the signature of the faulty bearing to emerge in the order-1 and order-2 spectrograms and facilitates detection and identification of the bearing fault.

The method 100 according to the invention optionally comprises a step 150 of a maintenance operation. The maintenance operation can be implemented as a function of the detection of one or more faulty bearings, the signatures of which enabled detection in the previous step. By way of example, the maintenance operation is an operation of repairing or replacing said bearing.

The maintenance operation can especially be implemented as a function of the nature of the bearing fault detected and the evaluated state of health of the bearing. More particularly, the criticality of the bearing fault can be evaluated in order to evaluate the need to carry out the maintenance operation. This criticality can be evaluated on the basis of the order-1 and order-2 spectrograms and specific requirements in terms of the safety of the rotating machine.

Alternatively, in step 120 of determining the spectrum of the angular signal, it is possible to determine the order-1 spectrum using a Welch procedure. The interest is thus to reduce variance of the random noise in the order-1 spectrum of the angular signal. In this case, determining the order-1 spectrum is equivalent to determining a power spectral density of the angular signal.

In the event that the spectral standardisation sub-step 124 has not been implemented, the second spectral standardisation sub-step 127 may comprise the sub-sub-steps of sub-step 124, in order to implement the TZ and determine the reduced 1-order spectrum.

Alternatively, the resampling steps 121 and 131 may be implemented in a step 115 for resampling the vibratory signal instead of being carried out in each of the steps 120 and 130 of determining the order-1 and order-2 spectrograms, respectively.

Advantageously, as the method 100 allows signals to be analysed over a short time window, it is possible to implement the method 100 to carry out real-time monitoring of the bearings of the rotating machine. This enables the operator or expert: to trigger the maintenance operation on the fly, i.e. as soon as the signature of the faulty bearing is detected.

Alternatively, the vibratory signal can be an acoustic signal, measured by means of an acoustic sensor such as a microphone or a piezoelectric sensor. The different steps of method 100 can be applied to both the vibratory signal and the acoustic signal.

In one alternative embodiment, the order-1 spectrogram is constructed from a first vibratory signal and the order-2 spectrogram is constructed from a second vibratory signal. The first and second vibratory signals are preferably acquired using a vibration sensor, such as an accelerometer, at different positions on the rotating machine, for example on two different shafts. The vibratory signals can also be acquired on the same shaft. Advantageously, this embodiment makes it possible to acquire more information in the spectrograms to improve robustness of the detection of a vibratory signature of a faulty bearing.

Thus, the first vibratory signal is used in step 120 of determining the order-1 spectrogram and the second vibratory signal is used in step 130 of determining the order-2 spectrogram. Preferably, the first and second vibratory signals are acquired for the same duration and their acquisition is synchronised so as to be simultaneous.

The method 100 according to the invention can be implemented by a system 10 for monitoring a rotating machine to detect a fault in a bearing, as described in FIG. 15. The system. The system 10 comprises an acquisition module 20, a treatment module 30 and, optionally, a detection module 40.

The acquisition module 20 serves to implement the acquisition step 110 and includes the vibration sensor 21a, a memory 22 and a processor 23. This is, for example, an acquisition apparatus adapted for acquiring vibratory signals. Preferably, the memory 22 includes instructions which, when executed, enable the processor 23 to perform the step 110 of acquiring the method 100. Alternatively, the vibration sensor 21a is the acoustic sensor 21b. Optionally, the acquisition module comprises the angular speed sensor 21c.

The processing module 30 serves to implement the steps for processing the vibratory signal acquired, herein the steps 120 and 130 for determining the order-1 and order-2 spectrograms, respectively. The processing module 30 comprises a processor 31 and a memory 32. The memory 32 includes instructions which, when executed, enable the steps 120 of determining the order-1 spectrogram and 130 of determining the order-2 spectrogram of the method 100 to be performed by the processor 31.

The system 10 may also comprise a communication means 50 to enable data communication between the acquisition module 20 and the processing module 30. it is, for example, a wired connection of the USB or Ethernet type, or a non-wired connection of the WiFi type.

The detection module 40 serves to implement the step 140 of detecting a vibratory signature of a faulty bearing, in the case where the detection is carried out automatically by an algorithm. The detection module comprises a processor 41 and a memory 42. The memory 42 includes instructions which, when executed, enable the step 140 of detecting a vibratory signature of a faulty bearing of the method 100 to be carried out by the processor 41.

The system 10 may also comprise a communication means 60 to enable data communication between the processing module 30 and the detection module 40. This may be, for example, a wired connection of the USB or Ethernet type, or a non-wired connection of the Wifi type.

The invention claimed is:

1. A method for monitoring a rotating machine to detect a fault in a bearing, the method comprising the following steps of:
    acquiring a vibratory signal from the rotating machine measured by a vibration sensor;
    determining an order-1 spectrogram by concatenating a plurality of reduced order-1 spectra, the reduced order-1 spectra being obtained by:
        applying delta transform to correct a plurality of order-1 spectra obtained by Fourier transforming the vibratory signal, the delta transform deleting interfering sources in the order-1 spectra from a subset of significant harmonics and a corrective value of each significant harmonic;
        determining the plurality of reduced order-1 spectra by applying spectral standardisation to the corrected order-1 spectra, the reduced order-1 spectra being of zero mean and a unit standard deviation;
    determining an order-2 spectrogram by concatenating a plurality of reduced order-2 spectra, the reduced order-2 spectra being obtained by:
        determining and averaging a cyclic coherence from the vibratory signal to obtain a plurality of averaged order-2 spectra, the cyclic coherence being determined from a double Fourier transform;
        applying delta transform to the plurality of averaged order-2 spectra and then spectral standardisation to obtain the plurality of reduced order-2 spectra, the delta transform being applied from the subset of significant harmonics and the corrective value of each significant harmonic;
    detecting a vibratory signature of the bearing fault from the order-1 spectrogram and the order-2 spectrogram and based on a reference signature.

2. The monitoring method according to claim 1, wherein the detection step further comprises identifying the faulty bearing from said vibratory signature.

3. The monitoring method according to claim 2, further comprising a maintenance step of the faulty bearing identified.

4. The monitoring method according to claim 1, wherein the vibratory signal is acquired over a plurality of different operating phases of the rotating machine.

5. The monitoring method according to claim 1, wherein the order-1 spectrogram and the order-2 spectrogram are determined from a Fourier Transform applied to the vibratory signal over a plurality of successive time windows with a duration of between 0.1 s and 10 s.

6. The monitoring method according to claim 1, wherein the acquisition step further comprises acquiring a speed signal of the rotating machine measured by means of a speed sensor.

7. The monitoring method according to claim 6, further comprising, in the step of determining the order-1 spectrogram, the following steps of:
    for each time window of the plurality of time windows:
        resampling the vibratory signal from the speed signal to obtain an angular signal;
        determining an order-1 spectrum by applying Fourier Transform to the angular signal;
        determining an corrected order-1 spectrum by applying Delta Transform to the order-1 spectrum;
        determining a standardised order-1 spectrum by applying spectral standardisation to the corrected order-1 spectrum;
        determining a flattened order-1 spectrum by applying spectral autocorrelation to the standardised order-1 spectrum;
    concatenating the flattened order-1 spectra, determined for each time window, to form the order-1 spectrogram.

8. The monitoring method according to claim 7, further comprising, in the step of determining the 1-order spectrogram, the following steps of:
    for each time window of the plurality of time windows:
        determining a corrected flattened order-1 spectrum by applying Delta Transform to the flattened order-1 spectrum;
        determining the reduced order-1 spectrum by applying spectral standardisation to the corrected flattened order-1 spectrum;
    the concatenation step being concatenating the reduced order-1 spectra, determined for each time window, to form the order-1 spectrogram.

9. The monitoring method according to claim 6 further comprising, in the step of determining the order-2 spectrogram, the following steps of:
    for each time window of the plurality of time windows:
        resampling the vibratory signal from the speed signal to obtain an angular signal;
        deleting the deterministic part of the angular signal to obtain a corrected vibratory signal;
        determining an order-2 spectrum from a cyclic coherence of the corrected vibratory signal;
        averaging the order-2 spectrum;
        determining a flattened order-2 spectrum by applying spectral autocorrelation to the averaged order-2 spectrum;
    concatenating the flattened order-2 spectra, determined for each time window, to form the order-2 spectrogram.

10. The monitoring method according to claim 9, further comprising, in the step of determining the order-2 spectrogram, the following steps of:
    for each time window of the plurality of time windows:
        determining a corrected flattened order-2 spectrum by applying Delta Transform to the flattened order-2 spectrum;
        determining the reduced order-2 spectrum by applying spectral standardisation to the corrected flattened order-2 spectrum;
    the concatenation step being concatenating the reduced order-2 spectra, determined for each time window, to form the order-2 spectrogram.

11. A non-transitory computer-readable recording medium comprising instructions which, when executed by a computer, cause the same to implement the steps of the method according to claim 1.

* * * * *